United States Patent
Euzen et al.

(10) Patent No.: US 8,137,532 B2
(45) Date of Patent: *Mar. 20, 2012

(54) PROCESS FOR PRODUCING MIDDLE DISTILLATES BY HYDROISOMERIZING AND HYDROCRACKING FEEDS FROM THE FISCHER-TROPSCH PROCESS

(75) Inventors: Patrick Euzen, Paris (FR); Christophe Gueret, St Romain en Gal (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 611 days.

This patent is subject to a terminal disclaimer.

(21) Appl. No.: 11/638,399

(22) Filed: Dec. 14, 2006

(65) Prior Publication Data

US 2007/0118008 A1 May 24, 2007

Related U.S. Application Data

(63) Continuation of application No. PCT/FR2006/000840, filed on Apr. 11, 2006.

(30) Foreign Application Priority Data

Apr. 25, 2005 (FR) ...................... 05 04143

(51) Int. Cl.
*C10G 47/02* (2006.01)
*C10G 47/12* (2006.01)
(52) U.S. Cl. .................. 208/111.3; 208/111.35; 208/57; 208/78; 208/89

(58) Field of Classification Search .................. 208/110, 208/111.01, 111.3, 111.35, 57, 78, 89
See application file for complete search history.

(56) References Cited

U.S. PATENT DOCUMENTS

| 6,551,500 B1 * | 4/2003 | Kobayashi et al. ........ 208/111.3 |
| 2006/0144755 A1 * | 7/2006 | Benazzi et al. ............... 208/108 |

FOREIGN PATENT DOCUMENTS

WO WO 2004/076598 * 9/2004

* cited by examiner

*Primary Examiner* — Walter D Griffin
*Assistant Examiner* — Renee E Robinson
(74) *Attorney, Agent, or Firm* — Millen, White, Zelano & Branigan, P.C.

(57) ABSTRACT

The invention concerns a process for producing middle distillates from a paraffinic feed produced by Fischer-Tropsch synthesis, using a hydrocracking/hydroisomerization catalyst which comprises 0.2% to 2.5% by weight of an oxide of a doping element selected from boron, phosphorus, silicon, at least one hydrodehydrogenating element selected from the group formed by noble elements from group VIII of the periodic table, a non-zeolitic support based on silica-alumina containing more than 5% by weight and 95% by weight or less of silica ($SiO_2$), specifically defined pore characteristics, a BET specific surface area in the range 100 to 550 $m^2/g$, and with an X ray diffraction diagram which contains at least the characteristic principal peaks of at least one of the transition aluminas included in the group composed of alpha, rho, khi, eta, gamma, kappa, theta and delta aluminas.

22 Claims, 4 Drawing Sheets

PROCESS FOR PRODUCING MIDDLE DISTILLATES BY HYDROISOMERIZING AND HYDROCRACKING FEEDS FROM THE FISCHER-TROPSCH PROCESS

This application is a continuation of International Application PCT/FR06/00840 filed Apr. 11, 2006, which claims benefit of priority from French Application 05/04.143 filed Apr. 25, 2005.

The present invention relates to a process for hydrocracking and hydroisomerization treatment of feeds from the Fischer-Tropsch process, to produce middle distillates (gas oil, kerosene) employing a catalyst comprising a particular silica-alumina.

In the Fischer-Tropsch process, synthesis gas ($CO+H_2$) is catalytically transformed into oxygen-containing products and essentially straight-chain hydrocarbons in the gas, liquid or solid form. Such products are generally free of heteroatomic impurities examples of which are sulphur, nitrogen or metals. They also contain practically no or only a few aromatics, naphthenes and more generally cycles, in particular in the case of cobalt catalysts. In contrast, they may have a non negligible amount of oxygen-containing products which, expressed as the weight of oxygen, is generally less than about 5% by weight, and also an amount of unsaturated compounds (generally olefinic products) which is generally less than 10% by weight. However, such products, principally constituted by normal paraffins, cannot be used as they are, in particular because of their cold properties which are not compatible with the usual use of oil cuts. As an example, the pour point of a straight-chain hydrocarbon containing 20 carbon atoms per molecule (boiling point of about 340° C., i.e. usually in the middle distillates cut range) is about +37° C., rendering its use impossible, as the specification is −15° C. for gas oil. Hydrocarbons from the Fischer-Tropsch process comprising mainly n-paraffins have to be transformed into products which are more upgradable, such as gas oil, kerosene which are, for example, obtained after catalytic hydroisomerization reactions.

European patent EP-A-0 583 836 describes a process for producing middle distillates from a feed obtained by the Fischer-Tropsch process. In this process, the feed is treated as a whole, and in addition the C4− fraction can be removed to obtain a C5+ fraction boiling at almost 100° C. Said feed undergoes hydrotreatment then hydroisomerization with a conversion (of products boiling above 370° C. into products with a lower boiling point) of at least 40% by weight. A catalyst for use in hydroconversion has a "platinum on silica-alumina" formulation. The conversions described in the examples are at most 60% by weight.

EP-A-0 321 303 also describes a process for treating said feeds to produce middle distillates and possibly oils. In one implementation, the middle distillates are obtained by a process consisting of treating the heavy fraction of the feed, i.e. with an initial boiling point in the range 232° C. to 343° C., by hydroisomerization on a fluorinated catalyst containing a metal from group VIII and alumina and having particular physico-chemical characteristics. After hydroisomerization, the effluent is distilled and the heavy portion is recycled to the hydroisomerization step. The hydroisomerization conversion of 370° C.+ products is given as being in the range 50-95% by weight and the examples give 85-87%.

All of the catalysts in current use in hydroisomerization are bifunctional in type, associating an acid function with a hydrogenating function. The acid function is supplied by supports with large surface areas (generally of 150 to 800 $m^2/g$) and with a superficial acidity, such as halogenated aluminas (chlorinated or fluorinated), phosphorus-containing aluminas, combinations of oxides of boron and aluminium, amorphous alumina-silicas and zeolites. The hydrogenating function is supplied either by one or more metals from group VIII of the periodic table such as iron, cobalt, nickel, ruthenium, rhodium, palladium, osmium, iridium or platinum, or by a combination of at least one metal from group VI of the periodic table such as chromium, molybdenum or tungsten, and at least one group VIII metal.

The balance between the two functions, acid and hydrogenating, is one parameter which governs the activity and selectivity of the catalyst. A weak acid function and a strong hydrogenating function produces less active catalysts which are also less selective as regards isomerization while a strong acid function and a weak hydrogenating function products catalysts which are highly active and selective as regards cracking. A third possibility is to use a strong acid function and a strong hydrogenating function to obtain a catalyst which is highly active but also highly selective as regards isomerization. Thus, by carefully selecting each of the functions, it is possible to adjust the activity/selectivity balance of the catalyst.

The performance of these catalysts is closely linked to their physico-chemical characteristics, more particularly their textural characteristics. Thus and in general, the presence of macropores in catalysts comprising an alumina-silica (such as those described, for example, in U.S. Pat. No. 5,370,788) is a disadvantage. The term "macropores" means pores with a diameter of more than 500 Å.

In setting out to solve this problem, the Applicant was led to prepare hydrocracking catalysts based on silica-alumina with smaller macropore ratios and with improved catalytic performance in processes for hydrocracking and hydroisomerization of paraffins from a Fischer-Tropsch synthesis process.

Thus, the present invention concerns a process for producing middle distillates. This process can:
  greatly improve the cold properties of paraffins from the Fischer-Tropsch process and produce boiling points which correspond to those of gas oil and kerosene fractions (also termed middle distillates) and in particular, can improve the freezing point of kerosenes;
  improve the quantity of middle distillates available by hydrocracking the heaviest paraffinic compounds present in the effluent from the Fischer-Tropsch unit, and which have boiling points which are higher than those from kerosene and gas oil cuts, for example the 380° C.+ fraction.

This process employs a particular silica-alumina which can produce highly selective and active catalysts.

More precisely, the invention concerns a process for producing middle distillates from a paraffinic feed produced by Fischer-Tropsch synthesis employing a particular hydrocracking/hydroisomerization catalyst, comprising at least one hydrodehydrogenating element selected from the group formed by elements from group VIB and group VIII of the periodic table, 0.2% to 2.5% by weight of an oxide of a doping element selected from phosphorus, boron and silicon, and a non-zeolitic support based on silica-alumina containing a quantity of more than 5% by weight and 95% by weight or less of silica ($SiO_2$), said catalyst having the following characteristics:
  a mean pore diameter, measured by mercury porosimetry, in the range 20 to 140 Å;
  a total pore volume, measured by mercury porosimetry, in the range 0.1 ml/g to 0.5 ml/g;

a total pore volume, measured by nitrogen porosimetry, in the range 0.1 ml/g to 0.5 ml/g;

a BET specific surface area in the range 100 to 550 m²/g;

a pore volume, measured by mercury porosimetry, included in pores with a diameter of more than 140 Å, of less than 0.1 ml/g;

a pore volume, measured by mercury porosimetry, included in pores with a diameter of more than 160 Å, of less than 0.1 ml/g;

a pore volume, measured by mercury porosimetry, included in pores with a diameter of more than 200 Å, of less than 0.1 ml/g;

a pore volume, measured by mercury porosimetry, included in pores with a diameter of more than 500 Å, of less than 0.1 ml/g;

an X ray diffraction diagram which contains at least the characteristic principal peaks of at least one transition alumina included in the group composed of alpha, rho, khi, eta, gamma, kappa, theta and delta aluminas;

a settled packing density of more than 0.75 g/cm³.

DETAILED DESCRIPTION OF THE INVENTION

Characterization Techniques

In the following description, the term "specific surface area" means the BET specific surface area determined by nitrogen adsorption in accordance with ASTM D 3663-78 established using the BRUNAUER-EMMETT-TELLER method described in "The Journal of the American Society", 60, 309 (1938).

In the following description, the term "mercury volume" of catalyst supports means the volume measured by mercury porosimetric intrusion in accordance with ASTM D4284-83 at a maximum pressure of 4000 bars, using a surface tension of 484 dynes/cm and a contact angle for amorphous silica-alumina catalysts of 140°. The mean mercury diameter is defined as a diameter whereby all pores with a dimension smaller than said diameter constitute 50% of the pore volume ($V_{Hg}$) in an interval in the range 36 Å to 1000 Å The wetting angle is taken to be 140°, following the recommendations in the work "Techniques de l'ingénieur, traité analyse et caractérisation", pages 1050-5, by Jean Charpin and Bernard Rasneur.

For greater accuracy, the value of the mercury volume in ml/g given in the text below corresponds to the total mercury volume (total mercury volume measured by mercury porosimetry intrusion) in ml/g measured for the sample minus the value of the mercury volume in ml/g measured for the same sample for a pressure corresponding to 30 psi (about 2 bars). The mean mercury diameter is also defined as the diameter for which all pores with a size less than this diameter constitute 50% of the total mercury pore volume.

To better characterize the pore distribution, we finally define the following criteria for the mercury pore distribution characteristics: volume V1 corresponds to the volume contained in pores for which the diameter is less than the mean diameter minus 30 Å. Volume V2 corresponds to the volume contained in pores with a diameter greater than or equal to the mean diameter minus 30 Å and less than the mean diameter plus 30 Å. Volume V3 corresponds to the volume contained in pores with a diameter greater than or equal to the mean diameter plus 30 Å. Volume V4 corresponds to the volume contained in pores with a diameter of less than the mean diameter minus 15 Å. Volume V5 corresponds to the volume contained in pores with a diameter greater than or equal to the mean diameter minus 15 Å and less than the mean diameter plus 15 Å. Volume V6 corresponds to the volume contained in pores with a diameter greater than or equal to the mean diameter plus 15 Å.

The pore distribution measured by nitrogen adsorption is determined by the Barrett-Joyner-Halenda model (BJH). The nitrogen adsorption-desorption isotherm using the BJH model is described in the periodical "The Journal of the American Society", 73, 373 (1951) by E P Barrett, L G Joyner and P P Halenda. In the description below, the term "nitrogen adsorption volume" means the volume measured for $P/P_0=0.99$, the pressure at which it is assumed that the nitrogen has filled all of the pores. The mean nitrogen desorption diameter is defined as a diameter such that all of the pores below this diameter constitute 50% of the pore volume ($V_p$) measured on the nitrogen isotherm desorption branch.

The term "surface adsorption" means the surface measured on the adsorption isotherm branch. Reference should be made to the article by A Lecloux in "Mémoires de la Société Royale des Sciences de Liège", 6$^{th}$ series, volume 1, section 4, pp 169-209 (1971).

The sodium content is measured by atomic absorption spectrometry.

X ray diffraction is a technique which can be used to characterize the supports and catalysts of the invention. In the description below, the X ray analysis was carried out on powder with a Philips PW 1830 diffractometer operating in reflection mode and provided with a back monochromator using the CoKalpha radiation line ($\lambda K_{\alpha 1}=1.7890$ Å, $\lambda K_{\alpha 2}=1.793$ Å, $K_{\alpha 1}/K_{\alpha 2}$ intensity ratio=0.5). Reference should be made to the ICDD database, number 10-0425, for the X ray diffraction diagram of gamma alumina. In particular, the 2 most intense peaks are located at a position corresponding to a d in the range 1.39 to 1.40 Å and to a d in the range 1.97 Å to 2.00 Å. The term "d" is the interplanar spacing which is deduced from the angular position using the Bragg relationship ($2d_{(hkl)}*\sin(\theta)=n*\lambda$). The term "gamma alumina" as used in the remainder of the text means, inter alia, for example, an alumina included in the group composed of cubic gamma, pseudo-cubic gamma, tetragonal gamma, low crystallinity or poorly crystallized gamma, high surface area gamma, low surface area gamma, gamma from coarse boehmite, gamma from crystalline boehmite, gamma from low crystallinity or poorly crystallized boehmite, gamma from a mixture of crystalline boehmite and an amorphous gel, gamma from an amorphous gel, and gamma developing towards delta alumina. Reference should be made to the article by B C Lippens, J J Steggerda in "Physical and Chemical Aspects of Adsorbents and Catalysts" by E G Linsen (Ed), Academic Press, London, 1970, p 171-211 for the diffraction peaks for eta, delta and theta aluminas.

For the supports and catalysts of the invention, the X ray diffraction diagram discloses a broad peak which is characteristic of the presence of amorphous silica.

Further, in the following text, the alumina compound may contain an amorphous fraction which is difficult to detect by XRD techniques. This therefore means that the alumina compounds used or described in the text may contain an amorphous fraction of a fraction with poor crystallinity.

The matrices and catalysts of the invention were analyzed by solid $^{27}$Al MAS NMR using a Brüker MSL 400 type spectrometer with a 4 mm probe. The sample rotation rate was of the order of 11 kHz. Aluminium NMR can potentially distinguish between three types of aluminium which have the following chemical displacements:

Between 100 and 40 ppm, tetra-coordinated type aluminium, $Al_{IV}$;

Between 40 and 20 ppm, penta-coordinated type aluminium, $Al_V$;

Between 20 and −100 ppm, hexa-coordinated type aluminium, $Al_{VI}$;

The aluminium atom is a quadripolar nucleus. Under certain analytical conditions (weak radiofrequency field: 30 kHz, low pulse angle: π/2 and water-saturated sample), magic angle spinning (MAS) NMR is a quantitative technique. The decomposition of MAS NMR spectra allows direct access to the quantities of the various species. The spectrum is calibrated as the chemical displacement with respect to a 1 M aluminium nitrate solution. The aluminium signal is at zero ppm. We elected to integrate the signals between 100 and 20 ppm for $Al_{IV}$ and $Al_V$, which corresponds to area 1, and between 20 and −100 for $Al_{VI}$ which corresponds to area 2. In the following description, the term "proportion of octahedral $Al_{VI}$" means the following ratio: area 2/(area 1+area 2).

The silicon environment in the alumina-silicas was studied by $^{29}Si$ NMR. The tables of chemical displacement as a function of the degree of condensation were deduced from the work by G Engelhardt and D Michel: "High resolution solid-state NMR of silicates and zeolites" (Wiley), 1987.

$^{29}Si$ NMR shows the chemical displacements of different species of silicon such as $Q^4$ (−105 ppm to −120 ppm), $Q^3$ (−90 ppm to −102 ppm) and $Q^2$ (−75 ppm to −93 ppm). Sites with a chemical displacement at −102 ppm may be sites of type $Q^3$ or $Q^4$, which we have termed $Q^{3-4}$ sites. The sites are defined as follows:

$Q^4$ sites: Si bonded to 4Si (or Al);
$Q^3$ sites: Si bonded to 3Si (or Al) and 1OH;
$Q^2$ sites: Si bonded to 2Si (or Al) and 2OH;

The alumina-silicas of the invention are composed of silicon of types $Q^2$, $Q^3$, $Q^{3-4}$ and $Q^4$. Many species will be of type $Q^2$, approximately of the order of 10% to 80%, preferably 20% to 60% and more preferably 20% to 40%. The proportion of $Q^3$ and $Q^{3-4}$ species is also high, approximately of the order of 5% to 50% and preferably 10% to 40% for the two species.

The environment for the silicon atoms was studied by MAS NMR CP $^1H\text{->}^{29}Si$ (300 MHz, rotation rate: 4000 Hz). In this case, only silicon bonded to OH bonds responds. The table of chemical displacements used was that from Kodakari et al, Langmuir 14, 4623-4629, 1998. The following attributions are made: −108 ppm ($Q^4$), −99 ppm ($Q^3/Q^4$(1 Al)), −91 ppm ($Q^3/Q^3$(1Al)), −84 ppm ($Q^2/Q^3$(2Al)), −78 ppm ($Q^2/Q^3$(3Al)) and −73 ppm ($Q^1/Q^2$(3Al)).

The alumina-silicas of the invention are in the form of a superimposition of several masses. The principal peak of these masses is generally located at −110 ppm.

One method for characterizing the catalysts of the invention which may be used is transmission electron microscopy (TEM). To this end, an electron microscope (of the Jeol 2010 or Philips Tecnai20F type, with optional scanning) was used, provided with an energy dispersion spectrometer (EDS) for X ray analysis (for example a Tracor or Edax). The EDS detector has to allow detection of light elements. The combination of the two tools, TEM and EDS, can combine imagery and local chemical analysis with good spatial resolution.

For this type of analysis, the samples are finely ground in a mortar; the powder is then included in resin to produce ultrafine sections with a thickness of about 70 nm. Such sections are collected on copper grids coated with a film of perforated amorphous carbon acting as a support. They are then introduced into the microscope for observation and analysis under high vacuum. With imagery, the sample zones are readily distinguished from the resin zones. A certain number of analyses are then carried out, a minimum of 10, preferably in the range 15 to 30, on different zones of the industrial sample. The size of the electron beam for zone analysis (approximately determining the size of the analyzed zones) is 50 nm in diameter as a maximum, preferably 20 nm, and more preferably 10, 5, 2 or 1 nm in diameter. In scanning mode, the analyzed zone will be a function of the size of the scanned zone and not the size of the beam, which is generally less.

Semi-quantitative processing of X ray spectra recorded using the EDS spectrometer can produce the relative concentration of Al and Si (as an atomic %) and the Si/Al ratio for each of the analyzed zones. The mean, $Si/Al_m$, and the standard deviation, σ, of this set of measurements can then be calculated. In the non-limiting examples of the description which follows, the 50 nm probe was used to characterize the supports and catalysts of the invention unless otherwise indicated.

The settled packing density (SPD) is measured as described in "Applied Heterogeneous Catalysis" by J F Le Page, J Cosyns, P Courty, E Freund, J-P Franck, Y Jacquin, B Juguin, C Marcilly, G Martino, J Miquel, R Montamal, A Sugier, H Van Landehchem, Technip, Paris, 1987. A suitably sized graduated cylinder is filled by successive additions and, between two successive additions, the catalyst is settled by shaking the cylinder to constant volume. This measurement is generally carried out on 1000 cm$^3$ of catalyst packed into a cylinder with a height to diameter ratio of close to 5:1. This measurement is preferably carried out using automated apparatus such as the Autotap® sold by Quantachrome®.

The acidity of the matrix is measured by infrared spectrometry (IR). The IR spectra are recorded on a Nicolet Nexus-670 type interferometer at a resolution of 4 cm$^{-1}$ with Happ-Gensel type apodisation. The sample (20 mg) is pressed into a self-supporting pellet and placed in an in situ analytical cell (25° C. to 550° C., furnace offset from IR beam, high vacuum of 10$^{-6}$ mbars). The pellet diameter is 16 mm.

The sample is pre-treated as follows to eliminate physisorbed water and to partially dehydroxylate the catalyst surface to provide an image which is representative of the catalyst acidity when in operation:

temperature rise from 25° C. to 300° C. over 3 hours;
iso-temperature for 10 hours at 300° C.;
temperature fall from 300° C. to 25° C. over 3 hours.

The basic probe (pyridine) is then adsorbed at saturated pressure at 25° C. then thermo-desorbed in the following stages:

25° C. for 2 hours under high vacuum;
100° C. for 1 hour under high vacuum;
200° C. for 1 hour under high vacuum;
300° C. for 1 hour under high vacuum.

A spectrum is recorded at 25° C. at the end of the pre-treatment and at each desorption stage in transmission mode with an accumulation time of 100 s. The spectra are recorded at iso-mass (and thus assumed to be iso-thickness) (exactly 20 mg). The number of Lewis sites is proportional to the surface area of the peak with a maximum near 1450 cm$^{-1}$, including shoulders. The number of Bronsted sites is proportional to the surface area of the peak with a maximum near 1545 cm$^{-1}$. The ratio of the number of Bronsted sites/number of Lewis sites, B/L, is estimated to be equal to the ratio of the surface areas of the two peaks described above. In general, the surface areas of the peaks at 25° C. are used. This ratio B/L is generally calculated from the spectrum recorded at 25° C. at the end of pre-treatment.

When a doping element, P and/or B and/or Si, is introduced, its distribution and location may be determined by techniques such as a Castaing microprobe (distribution profile of the various elements), a transmission electron microscope coupled to X ray analysis of the catalyst components, or by establishing a distribution map of the elements present in the catalyst by electron microprobe. These techniques can show the presence of these exogenous elements added after synthesis of the alumina-silica of the invention.

The overall composition of the catalyst may be determined by X ray fluorescence of the catalyst in the powdered state or by atomic absorption after acid attack of the catalyst.

The local composition on the micronic scale, as opposed to the overall composition of the catalyst, may be measured by electron microprobe. This measurement may be made by determining the amounts of metal in zones of a few cubic microns along the diameter of a particle of catalyst which is termed the measurement unit. This measurement allows the macroscopic distribution of the elements inside the particles to be evaluated. It may optionally be supplemented on the nanometric scale by STEM (scanning transmission electron microscopy).

The analyses are carried out using a CAMECA SX100 electron microprobe (provided with 5 wavelength dispersion spectrometers) (preferred apparatus) or optionally using a JEOL 8800R (4 spectrometers). The acquisition parameters are as follows: acceleration voltage 20 kV, current 80 or 200 nA and count time 10 s or 20 s depending on the concentration. The particles are coated in resin then polished to diameter.

It should be noted that the term "diameter" does not refer solely to a shape of a bead or extrudate, but more generally to any particle shape; it is termed the "diameter" because it is the representative length of the particle on which the measurement is made.

The measurements are made on a representative sample of the bed or catalyst batch to be used in the catalytic bed. The analyses should be carried out on at least 5 particles with at least 30 measurements per particle, uniformly distributed along the diameter.

The local concentrations (expressed as a %) of molybdenum, nickel, tungsten and phosphorus are respectively termed CMo, CNi, CW and CP.

It is also possible to express the concentrations as an atomic %; the relative fluctuations are the same.

It may be advantageous to prepare catalysts with homogeneous concentrations CMo, CNi, CW and CP along the extrudate. It is also advantageous to prepare catalysts having different core and peripheral CMo, CNi, CW and CP concentrations. These catalysts have "dished" or "domed" distribution profiles. A further distribution type is the crust type where the elements of the active phase are distributed on the surface.

The present invention concerns a process for producing middle distillates using a hydrocracking/hydroisomerization catalyst which comprises:
  at least one hydrodehydrogenating element selected from the group formed by elements from group VIB and group VIII of the periodic table;
  0.2% to 2.5% of a doping element selected from phosphorus, boron and silicon, preferably boron or phosphorus, and more preferably phosphorus;
  and a non-zeolitic support based on silica-alumina containing a quantity of more than 5% by weight and 95% by weight or less of silica ($SiO_2$);
  said catalyst having the following characteristics:
  a mean pore diameter, measured by mercury porosimetry, in the range 20 to 140 Å;
  a total pore volume, measured by mercury porosimetry, in the range 0.1 ml/g to 0.5 ml/g, preferably less than 0.45 ml/g and more preferably less than 0.4 ml/g;
  a total pore volume, measured by nitrogen porosimetry, in the range 0.1 ml/g to 0.5 ml/g, preferably less than 0.45 ml/g and more preferably less than 0.4 ml/g;
  a BET specific surface area in the range 100 to 550 $m^2/g$, preferably in the range 150 to 500 $m^2/g$, more preferably less than 350 $m^2/g$ and still more preferably less than 250 $m^2/g$;
  a pore volume, measured by mercury porosimetry, included in pores with a diameter of more than 140 Å, of less than 0.1 ml/g;
  a pore volume, measured by mercury porosimetry, included in pores with a diameter of more than 160 Å, of less than 0.1 ml/g;
  a pore volume, measured by mercury porosimetry, included in pores with a diameter of more than 200 Å, of less than 0.1 ml/g, preferably less than 0.075 ml/g and more preferably less than 0.05 ml/g;
  a pore volume, measured by mercury porosimetry, included in pores with a diameter of more than 500 Å, of less than 0.1 ml/g, preferably less than 0.05 ml/g and more preferably less than 0.02 ml/g, more preferably strictly more than 0.01 ml/g and less than 0,1 ml/g;
  an X ray diffraction diagram which contains at least the characteristic principal peaks of at least one transition alumina included in the group composed of alpha, rho, khi, eta, gamma, kappa, theta and delta aluminas;
  a catalyst settled packing density of more than 0.75 $g/cm^3$, preferably more than 0.85 $g/cm^3$, more preferably more than 0.95 $cm^3/g$ and still more preferably more than 1.05 $g/cm^3$.

Characteristics of the Support of the Catalyst of the Invention

The silica-alumina based used in the catalyst of the invention is preferably a homogeneous alumina-silica on the micrometric scale in which the cationic impurities content (for example $Na^+$) is less than 0.1% by weight, preferably less than 0.05% by weight and more preferably less than 0.025% by weight and the anionic impurities content (for example $SO_4^{2-}$ or $Cl^-$) is less than 1% by weight, preferably less than 0.5% by weight and more preferably less than 0.1% by weight.

Thus, any alumina-silica synthesis process known to the skilled person leading to an alumina-silica which is homogeneous on the micrometric scale and in which the cationic impurities content (for example $Na^+$) may be brought down to less than 0.1% by weight, preferably less than 0.05% by weight and more preferably less than 0.025% by weight, and in which the anionic impurities content (for example $SO_4^{2-}$ or $Cl^-$) may be brought down to less than 1% by weight, more preferably less than 0.05% by weight, is suitable for the preparation of the supports of the invention.

The catalyst support of the invention is a non-zeolitic support based on alumina-silica (i.e. comprising alumina and silica) with a silica ($SiO_2$) content of more than 5% by weight to 95% by weight or less, preferably in the range 10% to 80% by weight, more preferably a silica content of more than 20% by weight and less than 80% by weight and still more preferably more than 25% by weight and less than 75% by weight. The silica content in the support is advantageously in the range 10% to 50% by weight.

The environment of the silicon in the alumina-silicas is studied by $^{29}Si$ NMR. The alumina-silicas of the invention are composed of silicon of types $Q^2$, $Q^3$, $Q^{3-4}$ and $Q^4$. Many species will be of type $Q^2$, approximately of the order of 10% to 80%, preferably 20% to 60% and more preferably 20% to 40%. The proportion of $Q^3$ and $Q^{3-4}$ species is also high, approximately of the order of 5% to 50% and preferably 10% to 40% for the two species.

The environment for the silicon atoms was studied by MAS NMR CP $^1H\text{->}^{29}Si$ (300 MHz, spin rate: 4000 Hz). In this case, only silicon bonded to OH bonds responds. The table of chemical displacements used was that from Kodakari et al, Langmuir 14, 4623-4629, 1998. The following attributions are made: −108 ppm ($Q^4$), −99 ppm ($Q^3/Q^4(1Al)$), −91 ppm ($Q^3/Q^3(1Al)$), −84 ppm ($Q^2/Q^3(2Al)$), −78 ppm ($Q^2/Q^3(3Al)$) and −73 ppm ($Q^1/Q^2(3Al)$).

The alumina-silicas of the invention are in the form of a superimposition of several masses. The principal peak of these masses is generally located at −110 ppm.

Solid $^{27}Al$ MAS NMR spectra of the supports and catalysts of the invention exhibit two distinct peak masses. A first type of aluminium with a maximum resonating at about 10 ppm extends between −100 and 20 ppm. The position of the maximum suggests that these species are essentially of the $Al_{VI}$ type (octahedral). A second minor type of aluminium with a maximum resonating at about 60 ppm extends between 20 and 110 ppm. This mass can be differentiated into at least two species. The predominant species of this mass here corresponds to $Al_{IV}$ atoms (tetrahedral). For the catalysts used in the process of the present invention, advantageously, the proportion of octahedral $Al_{VI}$ is more than 50%, preferably more than 60%, and more preferably more than 70%.

In one implementation of the invention, the catalyst contains a support comprising at least two alumino-silicate zones, said zones having Si/Al ratios which are higher or lower than the overall Si/Al ratio determined by X ray fluorescence. Thus, a support having a Si/Al ratio of 0.5 comprises two alumino-silicate zones, for example, one zone with a Si/Al ratio, determined by TEM, of less than 0.5 and the other zone with a Si/Al ratio, determined by TEM, in the range 0.5 to 2.5.

In a further implementation of the invention, the catalyst contains a single alumina-silica zone, said zone having a Si/Al ratio equal to the overall Si/Al ratio determined by X ray fluorescence and less than 2.3.

The acidity of the support for the catalyst of the invention may advantageously, but not in a manner which limits the scope of the invention, be measured by IR monitoring of pyridine thermo-desorption. In general, the ratio B/L, as described above, of the support of the invention is in the range 0.05 to 1, preferably in the range 0.05 to 0.7, and more preferably in the range 0.05 to 0.5.

Characteristics of Catalyst of the Invention

The catalyst of the invention thus comprises:
- a non-zeolitic support based on alumina-silica (i.e. comprising alumina and silica) with a silica content ($SiO_2$) of more than 5% by weight to 95% by weight or less, preferably in the range 10% to 80% by weight, preferably a silica content of more than 20% by weight to less than 80% by weight and more preferably of more than 25% by weight to less than 75% by weight; the silica content is advantageously in the range 10% to 50% by weight;
- preferably, a cationic impurities content of less than 0.1% by weight, preferably less than 0.05% by weight and more preferably less than 0.025% by weight. The term "cationic impurities content" means the total alkali content;
- preferably, an anionic impurities content of less than 1% by weight, more preferably less than 0.5% by weight and still more preferably less than 0.1% by weight;
- at least one hydrodehydrogenating element selected from the group formed by elements from group VIB and group VIII of the periodic table;
- preferably, a group VIB metal(s) content, in the metallic form or in the oxide form, in the range 1 to 50% by weight, preferably in the range 1.5% to 35%, more preferably in the range 1.5% to 30%;
- preferably, a group VIII metals content, in the metallic form or in the oxide form, in the range 0.1% to 30% by weight, preferably 0.2% to 25% and more preferably in the range 0.2% to 20%;
- at least one doping element deposited on the catalyst (the term "doping element" means an element introduced after preparing the alumino-silicate support described above) and selected from the group formed by phosphorus, boron and silicon, more preferably phosphorus. The phosphorus, boron, silicon contents, calculated in their oxide form, are in the range 0.2% to 2.5% and still more preferably in the range 0.2% to 1%;
- optionally, at least one group VIIB element (preferably manganese, for example), and a content in the range 0 to 20% by weight, preferably in the range 0 to 10% by weight of the compound in the oxide or metallic form;
- optionally, at least one group VB element (preferably niobium, for example), and a content in the range 0 to 40% by weight, preferably in the range 0 to 20% by weight of the compound in the oxide or metallic form;
- a mean pore diameter, measured by mercury porosimetry, in the range 20 to 140 Å, preferably in the range 40 to 120 Å and more preferably in the range 50 to 100 Å;
- preferably, a ratio between the volume V2, measured by mercury porosimetry, in the range $D_{mean}$−30 Å to $D_{mean}$+30 Å, to the total pore volume, also measured by mercury porosimetry, of more than 0.6, preferably more than 0.7 and still more preferably more than 0.8;
- preferably, a volume V3 included in pores with diameters of more than $D_{mean}$+30 Å, measured by mercury porosimetry, of less than 0.1 ml/g, preferably less than 0.06 ml/g and more preferably less than 0.04 ml/g;
- preferably, a ratio between the volume V5 included between $D_{mean}$−15 Å and $D_{mean}$+15 Å, measured by mercury porosimetry, and the volume V2 included between $D_{mean}$−30 Å and $D_{mean}$+30 Å, measured by mercury porosimetry, of more than 0.6, preferably more than 0.7 and more preferably more than 0.8;
- preferably, a volume V6 included in pores with diameters of more than $D_{mean}$+15 Å, measured by mercury porosimetry, of less than 0.2 ml/g. preferably less than 0.1 ml/g and more preferably less than 0.05 ml/g;
- a total pore volume, measured by mercury porosimetry, in the range 0.1 ml/g to 0.5 ml/g, preferably less than 0.45 ml/g and more preferably less than 0.4 ml/g;
- a total pore volume, measured by nitrogen porosimetry, in the range 0.1 ml/g to 0.5 ml/g, preferably less than 0.45 ml/g and more preferably less than 0.4 ml/g;
- a BET specific surface area in the range 100 to 550 $m^2/g$, preferably in the range 150 to 500 $m^2/g$, more preferably less than 350 $m^2/g$ and still more preferably less than 250 $m^2/g$;
- preferably, an adsorption surface area such that the ratio between the adsorption surface area and the BET specific surface area is more than 0.5, preferably more than 0.65 and more preferably more than 0.8;
- a pore volume, measured by mercury porosimetry, included in pores with diameters of more than 140 Å, of less than 0.1 ml/g, preferably less than 0.05 ml/g and more preferably less than 0.03 ml/g;
- a pore volume, measured by mercury porosimetry, included in pores with diameters of more than 160 Å, of less than 0.1 ml/g, preferably less than 0.05 ml/g and more preferably less than 0.025 ml/g;

a pore volume, measured by mercury porosimetry, included in pores with a diameter of more than 200 Å, of less than 0.1 ml/g, preferably less than 0.075 ml/g and more preferably less than 0.05 ml/g;

a pore volume, measured by mercury porosimetry, included in pores with a diameter of more than 500 Å, of less than 0.1 ml/g, preferably less than 0.05 ml/g and more preferably less than 0.02 ml/g, and still more preferably strictly more than 0.01 and less than 0.1 ml/g;

an X ray diffraction diagram which contains at least the characteristic principal peaks of at least one of the transition aluminas comprised in the group composed of rho, khi, kappa, eta, gamma, theta and delta aluminas, preferably containing at least the characteristic principal peaks of at least one of the transition aluminas comprised in the group composed of gamma, eta, theta and delta aluminas, still more preferably containing the characteristic principal peaks of gamma and eta alumina, still more preferably containing peaks with a d in the range 1.39 to 1.40 Å and with a d in the range 1.97 Å to 2.00 Å;

a catalyst settled packing density of more than 0.75 g/cm$^3$, preferably more than 0.85 g/cm$^3$, more preferably more than 0.95 g/cm$^3$ and still more preferably more than 1.05 g/cm$^3$.

When the doping element is phosphorus, the phosphorus content is advantageously in the range 0.01% to 4% by weight of oxide, more preferably in the range 0.01% to 2.5% by weight of oxide, more preferably in the range 0.2% to 2.5% and still more preferably in the range 0.2% to 2%.

Preferably, the hydrocracking/hydroisomerization catalyst is based on platinum and/or palladium.

Highly preferably, the hydrocracking/hydroisomerization catalyst contains 0.05% to 10% of a noble group VIII metal.

A preferred catalyst of the invention comprises the platinum-palladium combination and a phosphorus content in the range 0.01% to 4% by weight of oxide.

A highly preferred catalyst of the invention comprises the platinum-palladium combination and a phosphorus content in the range 0.01% to 2.5% by weight of oxide.

A more preferred catalyst of the invention comprises the platinum-palladium combination and a phosphorus content in the range 0.2% to 2.5% by weight of oxide.

A still more preferred catalyst of the invention comprises the platinum-palladium combination and a phosphorus content in the range 0.2% to 2% by weight of oxide.

The catalyst may also contain a minor proportion of at least one stabilizing element selected from the group formed by zirconium and titanium.

Preparation Processes

The catalysts of the invention may be prepared using any method known to the skilled person.

A preferred process for preparing a catalyst of the present invention comprises the following steps:

In a preferred preparation method, the precursor is obtained by direct forming of the alumina-silica alone or by forming alumina-silica with at least one binder, then drying and calcining. The group VIB and/or VIII elements, and optionally those selected from phosphorus, boron, silicon and optional elements from groups VB and VIIB, may then optionally be introduced using any method known to the skilled person, before or after forming and before or after calcining the precursor or catalyst.

The hydrogenating element may be introduced at any stage of the preparation, preferably during mixing, or more preferably after forming. Forming is followed by calcining; the hydrogenating element may also be introduced before or after calcining. The preparation is generally completed by calcining at a temperature of 250° C. to 600° C. A further preferred method of the present invention consists of forming the alumina-silica without a binder after mixing the latter, then passing the paste obtained through a die to form extrudates with a diameter in the range 0.4 to 4 mm. The hydrogenating function may then be introduced in part alone (in the case, for example, of combinations of oxides of group VIB and VIII metals) or completely, at the moment of mixing. It may also be introduced by one or more ion exchange operations into the calcined support constituted by at least one alumina-silica, optionally formed with a binder, using solutions containing precursor salts of the selected metals when these belong to group VIII. It may also be introduced by one or more operations for impregnation of the formed and calcined support, using a solution of precursors of oxides of metals from groups VIII (in particular cobalt and nickel) when the precursors of the oxides of metals from group VIB (in particular molybdenum or tungsten) have already been introduced on mixing the support. Finally, it may also be introduced, highly preferably by one or more operations for impregnating the calcined support constituted by at least one alumina-silica of the invention and optionally at least one binder, using solutions containing precursors of oxides of metals from groups VI and/or VIII, precursors of oxides of metals from group VIII preferably being introduced after those from group VIB or at the same time thereas.

Preferably, the support is impregnated using an aqueous solution. Impregnation of the support is preferably carried out using the "dry" impregnation method which is well known to the skilled person. Impregnation may be carried out in a single step using a solution containing all of the constituent elements of the final catalyst.

The catalyst of the present invention may thus comprise at least one element from group VIII such as iron, cobalt, nickel, ruthenium, rhodium, palladium, osmium, iridium or platinum. Preferred examples of group VIII metals are metals selected from the group formed by iron, cobalt, nickel, platinum, palladium and ruthenium. The catalyst of the invention may also comprise at least one element from group VIB, preferably tungsten or molybdenum. Advantageously, the following combinations of metals are used: platinum, palladium, platinum-palladium, nickel-molybdenum, cobalt-molybdenum, iron-molybdenum, iron-tungsten, nickel-tungsten, cobalt-tungsten; preferred combinations are: platinum, palladium, platinum-palladium, nickel-molybdenum, cobalt-molybdenum, cobalt-tungsten and more advantageously platinum-palladium and nickel-tungsten. It is also possible to use combinations of three metals, for example nickel-cobalt-molybdenum, nickel-molybdenum-tungsten, nickel-cobalt-tungsten. Advantageously, the following combinations are used: nickel-niobium-molybdenum, cobalt-niobium-molybdenum, iron-niobium-molybdenum, nickel-niobium-tungsten, cobalt-niobium-tungsten, iron-niobium-tungsten; preferred combinations are: nickel-niobium-molybdenum, cobalt-niobium-molybdenum. It is also possible to use combinations of four metals, for example nickel-cobalt-niobium-molybdenum. It is also possible to use combinations containing a noble metal such as ruthenium-niobium-molybdenum or ruthenium-nickel-niobium-molybdenum.

At least one of the following elements: phosphorus and/or boron and/or silicon and possibly element(s) selected from groups VIIB and VB are introduced into the catalyst at any stage of the preparation and using any technique which is known to the skilled person.

A preferred method of the invention consists of depositing the selected doping element or elements, for example boron and silicon, onto the precursor, which may or may not have been calcined, preferably calcined. To this end, an aqueous solution of at least one boron salt such as ammonium biborate or ammonium pentaborate is prepared in an alkaline medium and in the presence of hydrogen peroxide and dry impregnation is then carried out in which the pore volume of the precursor is filled with the solution containing boron, for example. In the case in which silicon is also deposited, for example, a solution of a silicone type silicon compound or a silicon oil emulsion is used.

Boron and silicon may also be deposited simultaneously using, for example, a solution containing a boron salt and a silicone type silicon compound. Thus, for example in the case in which the precursor is a nickel-tungsten type catalyst supported on alumina-silica, it is possible to impregnate this precursor using an aqueous solution of ammonium biborate and Rhodorsil E1P silicone from Rhodia, to dry, for example at 120° C., then to impregnate with a solution of ammonium fluoride, to dry at 120° C. for example, and then to calcine, for example and preferably in air in a traversed bed, for example at 500° C. for 4 hours.

The doping element selected from the group formed by phosphorus, silicon and boron and the group VIIB and VB elements may be introduced using one or more impregnation operations using an excess of solution on the calcined precursor.

When at least one doping element, P and/or B and/or Si, is introduced, its distribution and location may be determined by techniques such as a Castaing microprobe (distribution profile of the various elements), a transmission electron microscope coupled to X ray analysis of the catalyst components, or by establishing a distribution map of the elements present in the catalyst by electron microprobe. These techniques can show the presence of these exogenous elements added after synthesis of the alumina-silica of the invention.

It may be advantageous to prepare catalysts having homogeneous concentrations $C_{Mo}$, $C_{Ni}$, $C_W$ and $C_P$ along the extrudate. It is also advantageous to prepare catalysts having different core and peripheral $C_{Mo}$, $C_{Ni}$, $C_W$ and $C_P$ concentrations. These catalysts have "dished" or "domed" distribution profiles. A further distribution type is the crust type where the elements of the active phase are distributed on the surface.

In general, the core/periphery ratio of the concentrations $C_{Mo}$, $C_{Ni}$, $C_W$ and $C_P$ is in the range 0.1 to 3. In a variation of the invention, it is in the range 0.8 to 1.2. In a further variation of the invention, the core/periphery ratio for concentrations $C_P$ is in the range 0.3 to 0.8.

The preferred phosphorus source is orthophosphoric acid $H_3PO_4$, but salts and esters such as ammonium phosphates are also suitable. Phosphorus may, for example, be introduced in the form of a mixture of phosphoric acid and a basic organic compound containing nitrogen, such as ammonia, primary and secondary amines, cyclic amines, compounds from the pyridine family and quinolines and compounds from the pyrrole family. Tungsto-phosphoric or tungsto-molybdic acids may be used.

The amount of phosphorus is adapted, without limiting the scope of the invention, to form a mixed compound in solution and/or on the support, for example tungsten-phosphorus or molybdenum-tungsten-phosphorus. Said mixed compounds may be heteropolyanions. These compounds may be Anderson heteropolyanions, for example. The phosphorus content, expressed in its $P_2O_5$ form, is in the range 0.01% to 5.5% by weight, preferably in the range 0.01% to 4% by weight, more preferably in the range 0.2% to 2%, and still more preferably in the range 0.2% to 1%.

The boron source may be boric acid, preferably orthoboric acid $H_3BO_3$, ammonium biborate or pentaborate, boron oxide, boric esters. The boron may, for example, be introduced in the form of a mixture of boric acid, hydrogen peroxide and a basic organic compound containing nitrogen such as ammonia, primary and secondary amines, cyclic amines, compounds from the pyridine family and quinolines and compounds from the pyrrole family. The boron may, for example, be introduced using a solution of boric acid in a water/alcohol mixture.

Many sources of silicon may be used. It is possible to use ethyl orthosilicate $Si(OEt)_4$, siloxanes, polysiloxanes, silicones, silicone emulsions, halogenated silicates such as ammonium fluorosilicate $(NH_4)_2SiF_6$ or sodium fluorosilicate $Na_2SiF_6$. Silicomolybdic acid and its salts, silicotungstic acid and its salts may also advantageously be used. The silicon may, for example, be added by impregnating ethyl silicate in solution in a water/alcohol mixture. The silicon may, for example, be added by impregnating a silicone type silicon compound or silicic acid suspended in water.

The group VIB or group VIII metals of the catalyst of the present invention may be present completely or partially in the form of a metal and/or oxide and/or sulphide.

Examples of sources of molybdenum and tungsten which may be used are oxides and hydroxides, molybdic and tungstic acids and their salts, in particular ammonium salts such as ammonium molybdate, ammonium heptamolybdate, ammonium tungstate, phosphomolybdic acid, phosphotungstic acid and their salts, silicomolybdic acid, silicotungstic acid and their salts.

Sources of group VIII elements which may be used are well known to the skilled person. Examples of non noble metals are nitrates, sulphates, hydroxides, phosphates, halides, for example chlorides, bromides or fluorides and carboxylates, for example acetates and carbonates. For noble metals, halides may be used, for example chlorides, nitrates, acids such as chloroplatinic acid or oxychlorides such as ammoniacal ruthenium oxychloride.

Preferably, no other halogens apart from those introduced on impregnation are added, the halogen preferably being chlorine.

Preparation of Support

The Applicant has discovered that aluminosilicate supports obtained by mixing, at any stage, an alumina compound which is partially soluble in an acidic medium with a silica compound which is completely soluble or with a completely soluble combination of alumina and hydrated silica, then forming, followed by hydrothermal or thermal treatment to homogenize it on a micrometric scale or even on a nanometric scale, can produce a catalyst which is particularly active in hydrocracking processes. The term "partially soluble in an acidic medium" as used by the Applicant means that contact of the alumina compound prior to adding the completely soluble silica compound or the combination with an acidic solution, for example nitric acid or sulphuric acid, causes partial dissolution.

In a further implementation, it is possible to obtain the supports of the invention using a dry or hydrated silica powder.

Silica Sources

The silica compounds used in accordance with the invention may be selected from the group formed by silicic acid, silicic acid sols, hydrosoluble alkaline silicates, cationic silicon salts, for example hydrated sodium metasilicate, Ludox® in its ammoniacal or alkaline form, or quaternary ammonium silicates. The silica sol may be prepared using any method known to the skilled person. Preferably, a solution of decationized orthosilicic acid is prepared from a hydrosoluble alkaline silicate by ion exchange over a resin. In a further implementation, solutions of Nyacaol® or Nyacol® nano technologies may be used. In a further implementation, Aerosil® or Nyasil® silica powder may be used.

Sources of Completely Soluble Silica-aluminas

The soluble hydrated silica-aluminas used in the invention may be prepared by true co-precipitation under controlled stationary operating conditions (pH, concentration, temperature, mean residence time) by reacting a basic solution containing silicon, for example in the form of sodium silicate, optionally of aluminium, for example in the form of sodium aluminate, with an acidic solution containing at least one aluminium salt, for example aluminium sulphate. At least one carbonate or $CO_2$ may optionally be added to the reaction medium.

The term "true co-precipitation" as used by the Applicant means a process in which at least one aluminium compound which is completely soluble in a basic medium or in an acidic medium as described above, and at least one silicon compound as described above, are brought into contact, simultaneously or sequentially, in the presence of at least one precipitating and/or co-precipitating compound to obtain a mixed phase which is essentially constituted by hydrated silica-alumina which is optionally homogenized by intense agitation, shear, colloidal milling or by a combination of these individual operations. As an example, these hydrated silica-aluminas may have been prepared as described in the following American patents: U.S. Pat. Nos. 2,908,635; 3,423,332; 3,433,747; 3,451,947; 3,629,152 and 3,650,988.

Complete dissolution of the silica compound or the combination is determined approximately using the following method. A fixed quantity (15 g) of the silica compound or the hydrated combination is introduced into a medium at a fixed pH. Preferably, the concentration of solid with respect to a liter of suspension is 0.2 moles per liter. The pH of the dispersion solution is at least 12 and may be obtained using an alkaline source. Preferably, NaOH is advantageously used. The mixture is then mechanically stirred using a deflocculating turbine agitator for 30 minutes at 800 rpm. Once agitation is complete, the mixture is centrifuged for 10 minutes at 3000 rpm. The cake is separated from the supernatant liquid. The solution is filtered through a filter with a pore size of 4 and a diameter of 19 cm. Drying is then carried out followed by calcining the 2 fractions at 1000° C. A ratio R is then determined by dividing the decanted mass by the mass of solid in suspension. The term "completely soluble" is applied to a ratio R of at least 0.9.

Sources of Alumina

The alumina compounds used in the invention are partially soluble in an acidic medium. They are completely or partially selected from the group of alumina compounds with general formula $Al_2O_3.nH_2O$. In particular, hydrated alumina compounds may be used, such as: hydrargillite, gibbsite, bayerite, boehmite, pseudo-boehmite and amorphous or essentially amorphous alumina gels. It is also possible to use dehydrated forms of said compounds which are constituted by transition aluminas and which comprise at least one of the phases in the following group: rho, khi, eta, gamma, kappa, theta, delta, which essentially differ from each other by the organization of their crystalline structure. Alpha alumina, commonly termed corundum, may be incorporated into the catalyst of the invention in small proportions.

Partial dissolution property is an important property of the invention, and is applicable to hydrated alumina powders, to spray dried hydrated alumina powders, to dispersions or suspensions of hydrated alumina or to any combination thereof, prior to any addition of a compound containing all or part of the silicon.

The partial dissolution of the alumina compound is evaluated as follows. A precise quantity of the powdered alumina compound or suspended alumina compound is introduced into a medium at a predetermined pH. The mixture is then mechanically stirred. Once agitation is complete, the mixture is left without agitation for 24 hours. Preferably, the concentration of solid $Al_2O_3$ with respect to one liter of suspension is 0.5 moles per liter. The pH of the dispersion solution is 2 and is obtained either by using $HNO_3$ or HCl or $HClO_4$. Preferably, $HNO_3$ is used. The distribution of sedimented and dissolved fractions is monitored by assaying the aluminium by UV absorption. The supernatants are ultrafiltered (polyethersulphone membrane, Millipore NMWL 30000) and digested in concentrated acid. The quantity of aluminium in the supernatant corresponds to the non-sedimented alumina compound and to the dissolved aluminium, and the ultrafiltered fraction corresponds to the dissolved aluminium alone. The quantity of sedimented particles is deduced from the theoretical concentration of aluminium in the dispersion (assuming that all of the solid which has been introduced is dispersed) and the quantities of boehmite actually dispersed and the aluminium in solution.

The alumina precursors used in the present invention are thus distinguished from those used in the case of true co-precipitation, which are entirely soluble in an acidic medium: cationic alumina salts, for example aluminium nitrate. The methods of the invention are distinguished from true co-precipitations since one of the elements, in this case the aluminium compound, is partially soluble.

To use the alumina, any compound of alumina with general formula $Al_2O_3$ n $H_2O$ may be used. Its specific surface area is in the range 150 to 600 $m^2/g$. In particular, it is possible to use hydrated alumina compounds such as: hydrargillite, gibbsite, bayerite, boehmite, pseudo-boehmite and amorphous or essentially amorphous alumina gels. It is also possible to use dehydrated forms of said compounds which are constituted by transition aluminas and which comprise at least one of the phases in the group: rho, khi, eta, gamma, kappa, theta, delta and alpha, which differ essentially in the organization of their crystalline structures. During heat treatments, these various forms may interchange in a complex sequence which depends on the operating conditions of the treatment. It is also possible to use small amounts of alpha alumina, commonly known as corundum.

More preferably, the aluminium hydrate $Al_2O_3$ n $H_2O$ used is boehmite, pseudo-boehmite and amorphous or essentially amorphous alumina gels. A mixture of said products in any combination may also be used.

Boehmite is generally described as an aluminium monohydrate with formula $Al_2O_3,nH_2O$ which encompasses a wide range of materials with varying degrees of hydration and organization the distinctions between which may be blurred: the most hydrated gelatinous boehmite, in which n may be greater than 2, pseudo-boehmite or micro-crystalline boehmite in which n is in the range 1 to 2, then crystalline boehmite and finally boehmite properly crystallized into large crystals with n close to 1. The morphology of aluminium monohydrate may vary widely between the two limiting forms, acicular and prismatic. A whole series of various forms may be used between these two forms: chains, boats, interlaced plates.

The preparation and/or forming of aluminium hydrate may thus constitute the first step in preparing these catalysts. Many patents relate to the preparation and/or forming of supports based on transition alumina from aluminium monohydrate: U.S. Pat. Nos. 3,520,654, 3,630,670, 3,864,461, 4,154,812, 4,313,923, DE 3 243 193 and U.S. Pat. No. 4,371,513.

Relatively pure aluminium hydrates may be used in the form of powders, which may be amorphous or crystalline, or crystalline containing an amorphous part. The aluminium hydrate may also be introduced in the form of aqueous suspensions or dispersions. The aqueous aluminium hydrate suspensions or dispersions employed in accordance with the invention may be capable of being gelled or coagulated. The aqueous dispersions or suspensions may also be obtained, as is well known to the skilled person, by peptization of aluminium hydrates in water or acidulated water.

The aluminium hydrate dispersion may be produced by any process which is known to the skilled person: in a batch reactor, a continuous mixer, a grinder, or a colloidal mill. Such a mixture may also be produced in a plug flow reactor and in particular in a static mixer. "Lightnin" reactors can be cited.

Further, the source of alumina may also be an alumina which has already undergone a treatment which can improve its degree of dispersion. As an example, it is possible to improve the dispersion of the alumina source by a preliminary homogenization treatment. The term "homogenization" means at least one of the homogenization treatments described in the text below.

The aqueous dispersions or suspensions of alumina which may be used are fine or ultrafine aqueous suspensions or dispersions of boehmites which are composed of particles with colloidal dimensions.

The fine or ultrafine boehmites used in accordance with the present invention may in particular have been obtained in accordance with patents FR-A-1 261 182 and FR-A-1 381 282 or European patent application EP-A-0 015 196.

It is also possible to use aqueous suspensions or dispersions obtained from pseudo boehmite, amorphous alumina gels, aluminium hydroxide gels or ultrafine hydrargillite gels.

Aluminium monohydrate may be purchased from a variety of commercial sources of alumina such as PURAL®, CATAPAL®, DISPERSAL®, DISPAL® sold by SASOL, or HIQ® sold by ALCOA, or using methods which are known to the skilled person: it may be prepared by partial dehydration of aluminium trihydrate using conventional methods, or it may be prepared by precipitation. When said aluminas are in the form of a gel, they are peptized by water or an acidulated solution. For precipitation, the source of the acid may, for example, be at least one of the following compounds: aluminium chloride, aluminium sulphate or aluminium nitrate. The source of basic aluminium may be selected from basic aluminium salts such as sodium aluminate or potassium aluminate.

Examples of precipitating agents which may be used are sodium hydroxide, sodium carbonate, potassium hydroxide and ammonia. The precipitating agents are selected so that the alumina source of the present invention and its agents are precipitated together.

Depending on the acidic or basic nature of the starting aluminium-based compound, the aluminium hydrate is precipitated using a base or an acid selected, for example, from hydrochloric acid, sulphuric acid, sodium hydroxide or a basic or acidic aluminium compound such as those cited above. The two reagents may be aluminium sulphate and sodium aluminate. As an example, the preparation of aluminium alpha-monohydrate using aluminium sulphate and sodium aluminate is described in U.S. Pat. No. 4,154,812.

Pseudo-boehmite may be prepared using the process described in U.S. Pat. No. 3,630,670 by reacting an alkaline aluminate solution with a mineral acid solution. Pseudo-boehmite may be prepared using the process described in U.S. Pat. No. 3,630,670 by reacting an alkaline aluminate solution with a mineral acid solution. It may also be prepared as described in FR-A-1 357 830.

Amorphous alumina gels may be prepared using the processes described in the article "Alcoa Paper No 19 (1972)", pages 9 to 12, and in particular by reacting an acid aluminate or an aluminium salt, by hydrolysis of aluminium alcoholates or by hydrolysis of basic aluminium salts.

The aluminium hydroxide gels may those prepared using the processes described in U.S. Pat. Nos. 3,268,295 and 3,245,919.

The aluminium hydroxide gels may also be those prepared using the processes described in WO-A-00/01617, by mixing a source of acidic aluminium and a base or a source of basic aluminium and an acid to precipitate an alumina monohydrate, the subsequent steps being:

2—maturation;
3—filtration;
4—washing; and
5—drying, these processes being characterized in that the mixing in step one is carried out without back-mixing.

Ultrafine hydrargillite may be prepared using the process described in U.S. Pat. No. 1,371,808, by heating, to a temperature in the range from ambient temperature to 60° C., alumina gels in the form of a cake and containing 0.1 monovalent acid ions with respect to the alumina, expressed as $Al_2O_3$ molecules.

It is also possible to use aqueous suspensions or dispersions of ultrapure boehmite or pseudo-boehmite prepared using a process in which an alkaline aluminate is reacted with a carbonic anhydride to form a precipitate of amorphous aluminium hydroxycarbonate, separating the precipitate obtained by filtering then washing it (the process has been described in U.S. Pat. No. 3,268,295).

Subsequently,
a) in a first step, the washed amorphous aluminium hydroxycarbonate precipitate is mixed with a solution of an acid, a base or a salt or a mixture thereof; this mixture is made by pouring the solution onto the hydroxycarbonate, the pH of the medium so constituted being less than 11;
b) in a second step, the reaction mixture is heated to a temperature of less than 90° C. for a time of at least 5 minutes; and
c) in a third step, the medium resulting from the third step is heated to a temperature in the range 90° C. to 250° C.

The boehmite and pseudo-boehmite dispersions or suspensions obtained using this process have an alkali content of less than 0.005% expressed in the form of the ratio of the alkali metal oxide/$Al_2O_3$.

When very pure catalyst supports are to be made, ultrapure suspensions or dispersions of boehmites or pseudo-boehmites are preferably used, obtained using the process described above, or aluminium hydroxide gels which have been prepared by hydrolysis of aluminium alcoholates using a process of the type described in U.S. Pat. No. 2,892,858.

We shall now summarize the production process which produces such boehmite type aluminium hydroxide gels, obtained as a by-product in the production of alcohol by hydrolysis of an aluminium alcoholate or alkoxide (Ziegler synthesis). Ziegler alcohol synthesis reactions have been described in particular in U.S. Pat. No. 2,892,858. In that process, triethylaluminium is initially prepared from aluminium, hydrogen and ethylene, the reaction being carried out in two-steps with a partial recycle of the triethylaluminium.

Ethylene is added in the polymerization step and the product obtained is then oxidized to aluminium alcoholate, the alcohols being obtained by hydrolysis.

The aluminium hydroxide gels may also be those which are prepared in accordance with the processes described in U.S. Pat. Nos. 4,676,928 and 6,030,599.

The hydrated alumina obtained as a by-product of the Ziegler reaction is that described in a bulletin from CONOCO dated 19 Jan. 1971.

The dimensions of the alumina particles constituting the alumina source may vary widely. They are generally in the range 1 to 100 microns.

Methods

The support may advantageously be prepared using one of the methods described below.

As an example, one method for preparing a silica-alumina forming part of the invention consists of preparing a solution of orthosilicic acid ($H_2SiO_4$, $H_2O$), decationized by ion exchange, from a hydrosoluble alkaline silicate then simultaneously adding it to a cationic aluminium salt in solution, for example the nitrate, and to ammonia under controlled operating conditions; or adding the orthosilicic acid solution to the cationic aluminium salt in solution and co-precipitating the solution obtained with ammonia under controlled operating conditions, resulting in a homogeneous product. This silica-alumina hydrogel is mixed with an aluminium hydrate powder or suspension. After filtering and washing, drying with forming and then calcining, preferably in air, in a rotary furnace, at high temperature and for a time sufficient to encourage interactions between alumina and silica, generally at least 2 hours, a support with the characteristics of the invention is obtained.

Another method for preparing the silica-alumina of the invention consists of precipitating the alumina hydrate as above, filtering and washing it, then mixing it with aqueous orthosilicic acid to obtain a suspension, which is intimately homogenized by strong agitation and shearing. An Ultraturrax turbine or a Staro turbine may be used, or a colloidal mill, for example a Staro colloidal mill. The homogeneous suspension is then dried by spraying as before, and calcined between 500° C. and 1200° C. for at least 3 hours: a silica-alumina catalyst which may be used in the process of the invention is obtained.

A further method of the invention consists of preparing a solution of decationized orthosilicic acid, as before, then simultaneously or consecutively adding it to an alumina compound, for example an aluminium hydrate in powdered form or in acidulated suspension. To increase the pore diameter of the final silica-alumina, at least one basic compound may optionally be added to the reaction medium. After deep homogenization of the suspension by agitation, optional adjustment of the dry matter content by filtering and optional re-homogenization, the product is dried with simultaneous or consecutive forming, then calcined as above.

A further method which also forms part of the invention consists of preparing an aqueous suspension or dispersion of alumina, for example an aluminium monohydrate, then simultaneously or consecutively adding it to a silica compound, for example a sodium silicate. To increase the pore diameter of the final silica-alumina, at least one basic compound may optionally be added to the reaction medium. The catalyst is obtained by filtering and washing, optional washing with an ammoniacal solution to extract the residual sodium by ion exchange, and drying with simultaneous or consecutive forming. After drying with forming then calcining as before, a catalyst with the characteristics of the invention is obtained. The size of the alumina particles is preferably in the range 1 to 100 microns to obtain good homogenization of the silica-alumina catalyst of the invention.

To increase the diameter of the mesopores of the silica-alumina support, it may be particularly advantageous, as disclosed in U.S. Pat. No. 4,066,574, to prepare an aqueous suspension or dispersion of alumina, for example an aluminium monohydrate, then to neutralize it with a basic solution, for example ammonia, then to simultaneously or consecutively add it to a silica compound, for example a decationized orthosilicic acid solution. After intense homogenization of the suspension by agitation, optional adjustment of the dry matter content by filtering and optional re-homogenization, the product is dried with simultaneous or consecutive forming, then calcined as above. This method also forms part of the methods used in accordance with the invention.

In the description below of the methods above, the term "homogenization" is used to describe taking a product containing a solid fraction up into solution, for example a suspension, a powder, a filtered precipitate, then dispersing it with intense agitation. Homogenization of a dispersion is a process which is well known to the skilled person. Said homogenization may be carried out using any process which is known to the skilled person, for example in a batch reactor, a continuous mixer or a mill. Said mixing may be carried out in a plug reactor, in particular in a static reactor. "Lightnin" reactors may be cited. An Ultraturrax® turbine or a Staro® turbine may be used, or a colloidal mill, for example a Staro colloidal mill. Commercially available IKA® colloidal mills may also be used.

In the set of methods cited above, it may optionally be desirable to add, during any step of the preparation, a small proportion of at least one stabilizing element selected from the group formed by zirconium and titanium.

Catalyst and Support Forming

The support may be formed by forming the alumina-silica using any technique which is known to the skilled person. Forming may, for example, be carried out by extrusion, pelletization, by the oil drop coagulation method, by rotating plate granulation or by any other method which is known to the skilled person.

Forming may also be carried out in the presence of various constituents of the catalyst and extrusion of the mineral paste obtained, by pelletization, by forming into beads on a rotating bowl granulator or drum, by oil drop coagulation, oil-up coagulation or by any other known method for agglomerating a powder containing alumina and optionally other ingredients selected from those mentioned above.

The constituent elements of the matrix of the support may also be introduced partially or completely in the form of a powder.

The catalysts used in the present invention have the shape of spheres or extrudates. However, it is advantageous for the catalyst to be in the form of extrudates with a diameter in the range 0.5 to 5 mm, more particularly in the range 0.7 to 2.5 mm. The shapes are cylindrical (which may or may not be hollow), twisted cylinders, multilobes (2, 3, 4 or 5 lobes, for example), or rings. The cylindrical shape is preferably used, but any other form may be used.

Further, said supports used in the present invention may have been treated, as is well known to the skilled person, by additives to facilitate forming and/or to improve the final mechanical properties of the silica-alumina supports. Examples of additives which may be cited are cellulose, carboxymethyl cellulose, carboxyethyl cellulose, tall oil, xanthan gums, surfactants, flocculating agents such as polyacrylamides, carbon black, starches, stearic acid, polyacrylic alcohol, polyvinyl alcohol, biopolymers, glucose, polyethylene glycols, etc.

Partial adjustment of the characteristic porosity of the supports of the invention is carried out during this step for forming the support particles.

Forming may be carried out using catalyst forming techniques which are known in the art, such as extrusion, pelletization, spray drying or drageification.

Water may be added or removed to adapt the viscosity of the paste to be extruded. This step may be carried out at any stage of the mixing step. In the case of alumino-silicate supports, it may be advantageous to reduce the quantity of water in the paste to increase the mechanical strength of the paste. This generally results in a reduction in the total volume for an optimum acid content.

To adapt the solid material content of the paste to be extruded to render it extrudable, it is also possible to add a mainly solid compound, preferably an oxide or hydrate. Preferably, a hydrate is used, more preferably an aluminium hydrate. The loss on ignition of the hydrate is more than 15%.

The amount of acid added on mixing before forming is less than 30%, preferably in the range 0.5% to 20% by weight of the anhydrous mass of silica and alumina engaged in the synthesis.

Extrusion may be carried out using any conventional tool which is on the market. The paste issuing from the mixing step is extruded through a die, for example using a piston or a single or twin extrusion screw. This extrusion step may be carried out using any method which is known to the skilled person.

The support extrudates of the invention generally have a crush strength of at least 70 N/cm, more preferably 100 N/cm or more.

Calcining the Support

Drying is carried out using any technique which is known to the skilled person.

To obtain the support of the present invention, it is preferable to calcine in the presence of molecular oxygen, for example by flushing with air, at a temperature of 1100° C. or less. At least one calcining step may be carried out after any one of the preparation steps. This treatment may, for example, be carried out in a traversed bed, swept bed or in a static atmosphere. As an example, the furnace used may be a rotary furnace or a vertical furnace with radial flow layers. The calcining conditions—temperature and duration—principally depend on the maximum catalyst service temperature. The preferred calcining conditions are between more than one hour at 200° C. and less than one hour at 1100° C. Calcining may be carried out in the presence of steam. Final calcining may optionally be carried out in the presence of an acidic or basic vapour. As an example, calcining may be carried out in a partial pressure of ammonia.

Post-synthesis Treatments

Post-synthesis treatments may be carried out to improve the properties of the support, in particular its homogeneity as defined above.

In one preferred implementation, the post-synthesis treatment is a hydrothermal treatment. The hydrothermal treatment is carried out using any technique which is known to the skilled person. The term "hydrothermal treatment" means contact at any stage of the manufacture of the mixed support with water in the vapour phase or in the liquid phase. The term "hydrothermal treatment" encompasses maturation, steaming, autoclaving, calcining in moist air, and rehydration. Without restricting the scope of the invention, such a treatment may have the effect of rendering the silica component mobile.

According to the invention, maturation may take place before or after forming. In a preferred mode of the invention, hydrothermal treatment is carried out by steaming in a furnace in the presence of water vapour. The temperature during steaming may be in the range 600° C. to 1100° C., preferably over 700° C. for a period in the range 30 minutes to 3 hours. The steam content is more than 20 g of water per kg of dry air and preferably more than 40 g of water per kg of dry air, more preferably more than 100 g of water per kg of dry air. Such a treatment may, if required, completely or partially replace the calcining treatment.

The support may then optionally undergo hydrothermal treatment in a confined atmosphere. The term "hydrothermal treatment in a confined atmosphere" means treatment using an autoclave in the presence of water at a temperature which is above ambient temperature.

During said hydrothermal treatment, the formed alumina-silica may be treated in different manners. Thus, the alumina-silica may be impregnated with acid prior to its entry into the autoclave, alumina-silica autoclaving being carried out either in the vapour phase or in the liquid phase; said vapour or liquid phase in the autoclave may or may not be acidic. Impregnation prior to autoclaving may or may not be acidic. Said impregnation prior to autoclaving may be carried out dry or by immersing the silica-alumina or support in an aqueous acidic solution. The term "dry impregnation" means bringing the alumina into contact with a volume of solution which is less than or equal to the total pore volume of the treated alumina. Preferably, dry impregnation is carried out.

The autoclave is preferably a rotating basket autoclave such as that defined in EP-A-0 387 109.

The temperature during autoclaving may be in the range 100° C. to 250° C. for a period in the range 30 minutes to 3 hours.

Implementations of the Process of the Invention.

Preferred implementational modes of the invention will be described below with reference to FIGS. 1 to 6.

One implementation of the invention comprises the following steps:
 a) separating a single fraction, termed the heavy fraction, with an initial boiling point in the range 120-200° C.;
 b) hydrotreating at least a portion of said heavy fraction;
 c) fractionating into at least 3 fractions:
  at least one intermediate fraction having an initial boiling point T1 in the range 120° C. to 200° C., and an end point T2 of more than 300° C. and less than 410° C.;
  at least one light fraction boiling above the intermediate fraction;
  at least one heavy fraction boiling above the intermediate fraction;
 d) passing at least a portion of said intermediate fraction through a process of the invention over a non-zeolitic hydroisomerization/hydrocracking catalyst;
 e) passing at least a portion of said heavy fraction through a process of the invention over a non-zeolitic hydroisomerization/hydrocracking catalyst;
 f) distilling hydrocracked/hydroisomerized fractions to obtain middle distillates, and recycling the residual fraction boiling above said middle distillates in step e) over the catalyst treating the heavy fraction.

The description of this implementation will be made with reference to FIG. 1 which constitutes a non-limiting interpretation.

Step a)

The effluent from the Fischer-Tropsch synthesis unit arriving via line 1 is fractionated (for example by distillation) in a separation means 2 into at least two fractions: at least one light fraction and a heavy fraction with an initial boiling point equal to a temperature in the range 120° C. to 200° C., preferably in the range 130° C. to 180° C. and still more preferably at a temperature of about 150° C.; in other words, the cut point is located between 120° C. to 200° C. The light fraction of FIG. 1 leaves via line 3 and the heavy fraction leaves via line 4.

This fractionation may be carried out using methods which are well known to the skilled person, such as flash, distillation, etc. By way of non-limiting example, the effluent from the Fischer-Tropsch synthesis unit undergoes flash, decanting to eliminate water and distillation to obtain at least the two fractions described above.

The light fraction is not treated using the process of the invention but may, for example, constitute a good feed for petrochemistry and more particularly for a steam cracking unit 5. The heavy fraction described above is treated using the process of the invention.

Step b)

This fraction is admitted in the presence of hydrogen (line 6) into a zone 7 containing a hydrotreatment catalyst which is aimed at reducing the amount of unsaturated olefinic compounds and to hydrotreat the oxygen-containing compounds (alcohols) present in the heavy fraction described above.

The catalysts used in said step b) are non-cracking or low cracking hydrotreatment catalysts comprising at least one metal from group VIII and/or group VI of the periodic table.

Advantageously, at least one element selected from P, B, Si is deposited on the support.

Said catalysts may be prepared using any method known to the skilled person or may be acquired from firms specializing in the fabrication and sale of catalysts.

In the hydrotreatment reactor 7, the feed is brought into contact in the presence of hydrogen and catalyst at operating temperatures and pressures that can carry out hydrodeoxygenation (HDO) of alcohols and hydrogenation of olefins present in the feed. The reaction temperatures used in the hydrotreatment reactor are in the range 100° C. to 350° C., preferably in the range 150° C. to 300° C., more preferably in the range 150° C. to 275° C. and still more preferably in the range 175° C. to 250° C. The total pressure range used varies from 5 to 150 bars, preferably 10 to 100 bars and more preferably between 10 and 90 bars. The hydrogen which supplies the hydrotreatment reactor is introduced at a rate such that the hydrogen/hydrocarbon volume ratio is in the range 100 to 3000 Nl/l/h, preferably in the range 100 to 2000 Nl/l/h and more preferably in the range 250 to 1500 Nl/l/h. The flow rate of the feed is such that the hourly space velocity is in the range 0.1 to 10 $h^{-1}$, preferably in the range 0.2 to 5 $h^{-1}$, and more preferably in the range 0.2 to 3 $h^{-1}$. Under these conditions, the amount of unsaturated molecules and oxygen-containing molecules is reduced to less than 0.5% and in general to less than 0.1%. The hydrotreatment step is carried out under conditions such that the conversion into products having boiling points of 370° C. or more into products having boiling points of less than 370° C. is limited to 30% by weight, preferably is less than 20% and still more preferably less than 10%.

Step c)

The effluent from the hydrotreatment reactor is supplied via a line 8 to a fractionation zone 9 where it is fractionated into at least three fractions:

at least one light fraction (leaving via line 10) the constituent compounds of which have boiling points lower than a temperature T1 in the range 120° C. to 200° C., preferably in the range 130° C. to 180° C. and more preferably at a temperature of about 150° C. In other words, the cut point is between 120° C. and 200° C.;

at least one intermediate fraction (line 11) comprising compounds the boiling points of which are in the range from the cut point T1 as defined above to a temperature T2 of more than 300° C., more preferably more than 350° C. and less than 410° C. or preferably less than 370° C.;

at least one heavy fraction (line 12) comprising compounds having boiling points over the cut point T2 as defined above.

Fractionation is carried out here by distillation, but it may be carried out in one or more steps and by means other than distillation.

This fractionation may be carried out by methods which are well known to the skilled person such as flash, distillation, etc.

The intermediate and heavy fractions described above are treated using the process of the invention.

Step d)

At least a portion of said intermediate fraction is then introduced (line 11), as well as an optional stream of hydrogen (line 13), into zone 14 containing the hydroisomerization/hydrocracking catalyst of the process of the present invention.

The operating conditions in which said step d) is carried out are as follows:

The pressure is maintained at between 2 and 150 bars, preferably between 5 and 100 bars and advantageously 10 to 90 bars, the space velocity is in the range 0.1 $h^{-1}$ to 10 $h^{-1}$ preferably in the range 0.2 to 7 $h^{-1}$ and advantageously between 0.5 and 5.0 $h^{-1}$. The hydrogen flow rate is in the range 100 to 2000 normal liters of hydrogen per liter of feed per hour, preferably in the range 150 to 1500 liters of hydrogen per liter of feed.

The temperature used in this step is in the range 200° C. to 450° C., preferably 250° C. to 450° C., advantageously 300° C. to 450° C., and more advantageously more than 320° C. or, for example, between 320-420° C.

Hydroisomerization and hydrocracking step d) is advantageously carried out under conditions such that the conversion per pass of products with a boiling point of 150° C. or more into products having boiling points of less than 150° C. is as low as possible, preferably less than 50%, more preferably less than 30%, and can produce middle distillates (gas oil and kerosene) having cold properties (pour point and freezing point) sufficiently good to satisfy current specifications for this type of fuel.

In this step d), hydroisomerization rather than hydrocracking is intended to be favoured.

Step e)

At least a portion of said heavy fraction is introduced via line 12 into a zone 15 where it is brought into contact with a hydroisomerization/hydrocracking catalyst in the presence of hydrogen 25, using the process of the present invention to produce a middle distillates cut (kerosene+gas oil) having good cold properties.

The catalyst used in zone 15 of step e) to carry out hydrocracking and hydroisomerization reactions of the heavy fraction, defined in accordance with the invention, is of the same type as that present in the reactor 14. However, it should be noted that the catalysts used in reactors 14 and 15 may be identical or different.

During said step e) the fraction entering the reactor is contacted with the catalyst and, in the presence of hydrogen, essentially hydrocracking reactions which, accompanied by n-paraffin hydroisomerization reactions, will improve the quality of the products formed and more particularly the cold properties of the kerosene and gas oil, and also obtain very good distillate yields. The conversion into products having boiling points of 370° C. or more into products with boiling points of less than 370° C. is over 80% by weight, usually at least 85% and preferably 88% or more. In contrast, the conversions of products with boiling points of 260° C. or more into products with boiling points less than 260° C. is at most 90% by weight, generally at most 70% or 80%, preferably at most 60% by weight.

Step f)

The effluents from reactors 14 and 15 are sent via lines 16 and 17 through a distillation train which integrates atmospheric distillation and possibly vacuum distillation, and which is aimed at separating the light products inevitably formed during steps d) and e), for example ($C_1$-$C_4$) gas (line 18) and a gasoline cut (line 19) and at distilling at least one gas oil cut (line 21) and kerosene (line 20). The gas oil and kerosene fractions may be partially recycled (line 23), jointly or separately, to the head of the hydroisomerization/hydrocracking reactor 14 of step d).

A fraction (line 22) is also distilled boiling above gas oil, i.e. the compounds which constitute it have boiling points over those of middle distillates (kerosene+gas oil). This fraction, termed the residual fraction, generally has an initial boiling point of at least 350° C., preferably more than 370° C. This fraction is advantageously recycled to the head of the reactor 15 via the hydroisomerization/hydrocracking line 26 for the heavy fraction (step e).

It may also be advantageous to recycle part of the kerosene and/or gas oil in step d), step e) or both. Preferably, at least one of the kerosene and/or gas oil fractions is recycled in part to step d) (zone 14). It can be shown that it is advantageous to recycle a portion of the kerosene to improve its cold properties.

Advantageously and at the same time, the non hydrocracked fraction is recycled in part to step e) (zone 15).

It goes without saying that the gas oil and kerosene cuts are preferably recovered separately, but the cut points are adjusted by the operator as a function of its needs.

BRIEF DESCRIPTION OF THE DRAWINGS

FIG. 1 shows a distillation column 24, but two columns may be used to separately treat the cuts from zones 14 and 15.

In FIG. 1, only a kerosene recycle to the catalyst of reactor 14 is shown. Clearly, a portion of the gas oil may be recycled (separately or with kerosene), preferably over the same catalyst as kerosene.

A further implementation of the invention comprises the following steps:

a) separating at least one light fraction from the feed to obtain a single fraction, termed the heavy fraction, with an initial boiling point in the range 120-200° C.;

b) optional hydrotreatment of said heavy fraction, optionally followed by a step c) for removing at least a portion of the water;

d) passing at least a portion of said fraction which may have been hydrotreated through a process of the invention, wherein conversion over the hydroisomerization/hydrocracking catalyst of products with a boiling point of 370° C. or more into products with boiling points of less than 370° C. is over 80% by weight;

e) distilling the hydrocracked/hydroisomerized fraction to obtain middle distillates, and recycling the residual fraction boiling above said middle distillates to step d).

Figure 2:
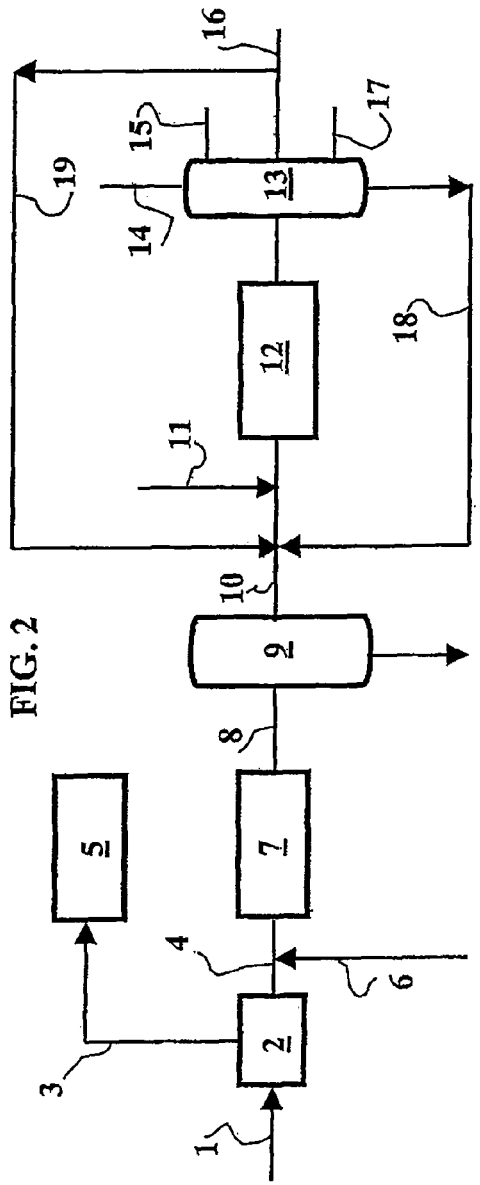

The description of this implementation will be made with reference to FIG. 2, although FIG. 2 does not limit the interpretation.

Step a)

Figure 1:
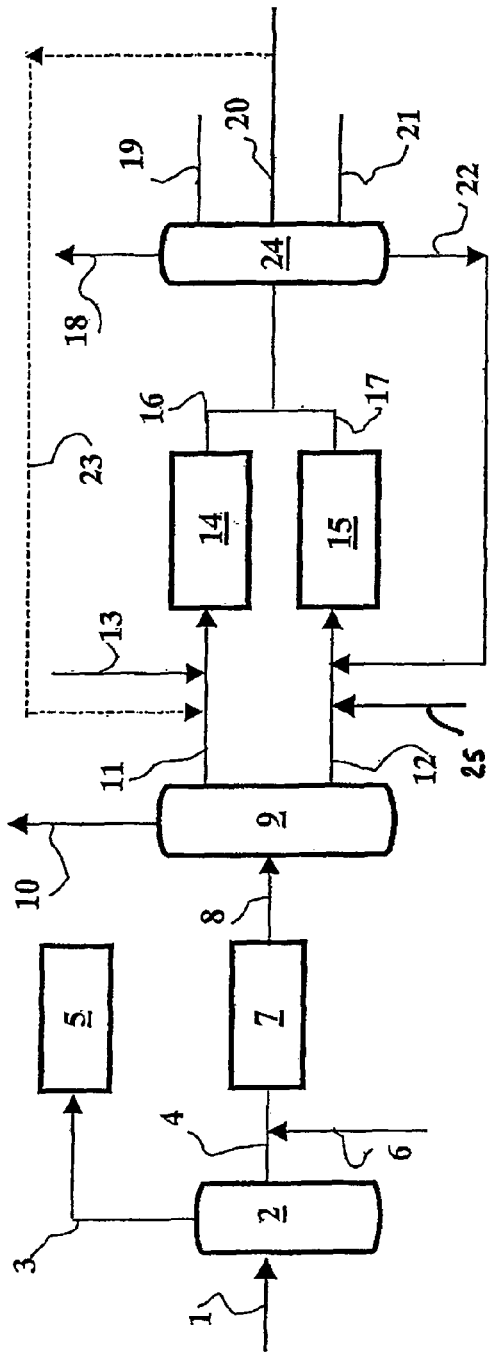
FIGS. 1-6 show schematically various embodiments of the invention.

The effluent from the Fischer-Tropsch synthesis unit arriving via line 1 is fractionated (for example by distillation) in a separation means 2 into at least two fractions: at least one light fraction and a heavy fraction with an initial boiling point equal to a temperature in the range 120° C. to 200° C., preferably in the range 130° C. to 180° C. and still more preferably at a temperature of about 150° C.; in other words, the cut point is located between 120° C. to 200° C. The light fraction of FIG. 1 leaves via line 3 and the heavy fraction leaves via line 4.

This fractionation may be carried out using methods which are well known to the skilled person such as flash, distillation, etc.

The light fraction is not treated using the process of the invention but may, for example, constitute a good feed for petrochemistry and more particularly for a steam cracking unit 5. The heavy fraction described above is treated using the process of the invention.

Step b)

Optionally, this fraction is admitted in the presence of hydrogen (line 6) into a zone 7 containing a hydrotreatment catalyst which is intended to reduce the amount of unsaturated olefinic compounds and to hydrotreat the oxygen-containing compounds (alcohols) present in the heavy fraction described above.

The catalysts used in this step b) are non-cracking hydrotreatment catalysts or low cracking catalysts comprising at least one metal from group VIII and/or group VI of the periodic table.

Advantageously, at least one element selected from P, B, Si is deposited on the support.

These catalysts may be prepared using any method known to the skilled person, or may be acquired from firms specialized in the fabrication and sale of catalysts.

In the hydrotreatment reactor 7, the feed is brought into contact in the presence of hydrogen and catalyst at operating temperatures and pressures that can carry out hydrodeoxygenation (HDO) of alcohols and hydrogenation of olefins present in the feed. The reaction temperatures used in the hydrotreatment reactor are in the range 100° C. to 350° C., preferably in the range 150° C. to 300° C., more preferably in the range 150° C. to 275° C. and still more preferably in the range 175° C. to 250° C. The total pressure range used varies from 5 to 150 bars, preferably 10 to 100 bars and more preferably between 10 and 90 bars. The hydrogen which supplies the hydrotreatment reactor is introduced at a rate such that the hydrogen/hydrocarbon volume ratio is in the range 100 to 3000 Nl/l/h, preferably in the range 100 to 2000 Nl/l/h and more preferably in the range 250 to 1500 Nl/l/h. The flow rate of the feed is such that the hourly space velocity is in the range 0.1 to 10 $h^{-1}$, preferably in the range 0.2 to 5 $h^{-1}$, and more preferably in the range 0.2 to 3 $h^{-1}$. Under these conditions, the amount of unsaturated molecules and oxygen-containing molecules is reduced to less than 0.5% and in general to less than 0.1%. The hydrotreatment step is carried out under conditions such that the conversion into products having boiling points of 370° C. or more into products having boiling points of less than 370° C. is limited to 30% by weight, preferably to less than 20% and still more preferably to less than 10%.

Step c)

The effluent (line 8) from hydrotreatment reactor 7 is optionally introduced into a zone 9 for removing water, which is aimed at eliminating at least a portion of the water produced during the hydrotreatment reactions. The water may be eliminated with or without eliminating the $C_4$ minus fraction which is generally produced during the hydrotreatment step. The term "elimination of water" means eliminating the water produced by the hydrodeoxygenation reactions (HDO) of alcohols, but it may also include eliminating at least a portion of the hydrocarbon saturation water. The water may be eliminated using any method and technique known to the skilled person, for example by drying, passage over a dessicant, flash, decanting, etc.

Step d)

The dried heavy fraction (optionally hydrotreated) is then introduced (line 10) as well as an optional stream of hydrogen (line 11) into zone 12 containing the hydroisomerization/hydrocracking catalyst. A further possibility of the process of the invention consists of sending all of the effluent from the hydrotreatment reactor (without drying) to the reactor containing the hydroisomerization/hydrocracking catalyst, preferably at the same time as a stream of hydrogen.

Before use in the reaction, the metal contained in the catalyst must be reduced. A preferred method for reducing the metal is the treatment in hydrogen at a temperature in the range 150° C. to 650° C. and a total pressure in the range 0.1 to 25 MPa. As an example, a reduction consists of a constant temperature stage at 150° C. of 2 hours, then raising the temperature to 450° C. at a rate of 1° C./min, then a constant temperature stage of 2 hours at 450° C.; during the whole of this reduction step, the hydrogen flow rate is 1000 liters of hydrogen/liter of catalyst. It should also be noted that any ex situ reduction is suitable.

The operating conditions in which said step d) is carried out are as follows:

The pressure is maintained at between 2 and 150 bars, preferably between 5 and 100 bars and advantageously 10 to 90 bars; the space velocity is in the range 0.1 $h^{-1}$ to 10 $h^{-1}$, preferably in the range 0.2 to 7 $h^{-1}$ and advantageously between 0.5 and 5.0 $h^{-1}$. The hydrogen flow rate is in the range 100 to 2000 normal liters of hydrogen per liter of feed per hour, preferably in the range 150 to 1500 liters of hydrogen per liter of feed.

The temperature used in this step is in the range 200° C. to 450° C., preferably 250° C. to 450° C., advantageously 300° C. to 450° C., and more advantageously more than 320° C. or, for example, between 320-420° C.

Hydroisomerization and hydrocracking step d) is advantageously carried out under conditions such that the conversion per pass of products with a boiling point of 370° C. or more into products having boiling points of less than 370° C. is more than 80% by weight, more preferably at least 85%, preferably more than 88%, to produce middle distillates (gas oil and kerosene) having cold properties (pour point and freezing) sufficiently good to satisfy current specifications for this type of fuel.

The two steps, hydrotreatment and hydroisomerization/hydrocracking, may be carried out on the two types of catalyst in two or more different reactors and/or in the same reactor.

Step e)

The effluent (hydrocracked/hydroisomerized fraction) at the outlet from the reactor 12, step d), is sent to a distillation train 13 which integrates atmospheric distillation and possibly vacuum distillation, and which is aimed at separating conversion products with a boiling point of less than 340° C. and preferably less than 370° C. and including those formed during step d) in the reactor 12, and to separate the residual fraction the initial boiling point of which is generally more than at least 340° C. and preferably more than at least 370° C. Of the converted and hydroisomerized products, in addition to the light gas $C_1$-$C_4$ (line 14), at least one gasoline fraction (line 15) is separated, and at least one kerosene middle distillate fraction (line 16) and gas oil fraction (line 17). The residual fraction with an initial boiling point generally of more than at least 340° C. and preferably at least 370° C. or more is recycled (line 18) to the head of the hydroisomerization and hydrocracking reactor 12.

It may also be advantageous to recycle (line 19) a portion of the kerosene and/or gas oil obtained to step d) (reactor 12).

A further implementation of the invention comprises the following steps:

a) fractionating (step a)) the feed into at least 3 fractions:
at least one intermediate fraction having an initial boiling point T1 in the range 120° C. to 200° C. and an end point T2 of more than 300° C. and less than 410° C.;
at least one light fraction boiling below the intermediate fraction;
at least one heavy fraction boiling above the intermediate fraction;

b) hydrotreating (step b)) at least a portion of said intermediate fraction then passage (step d)) through a process for treating at least a portion of the hydrotreated fraction over a hydrocracking/hydroisomerization catalyst;

f) passage (step f)) through a process for treating at least a portion of said heavy fraction over a hydrocracking/hydroisomerization catalyst with a conversion of 370° C.+ products into 370° C.– products of more than 80% by weight;

e) and g) distilling (steps e) and g)) at least a portion of the hydrocracked/hydroisomerized fractions to obtain middle distillates;

and at least one of said treatment processes of steps d) and f) is the process of the invention.

Figure 3:
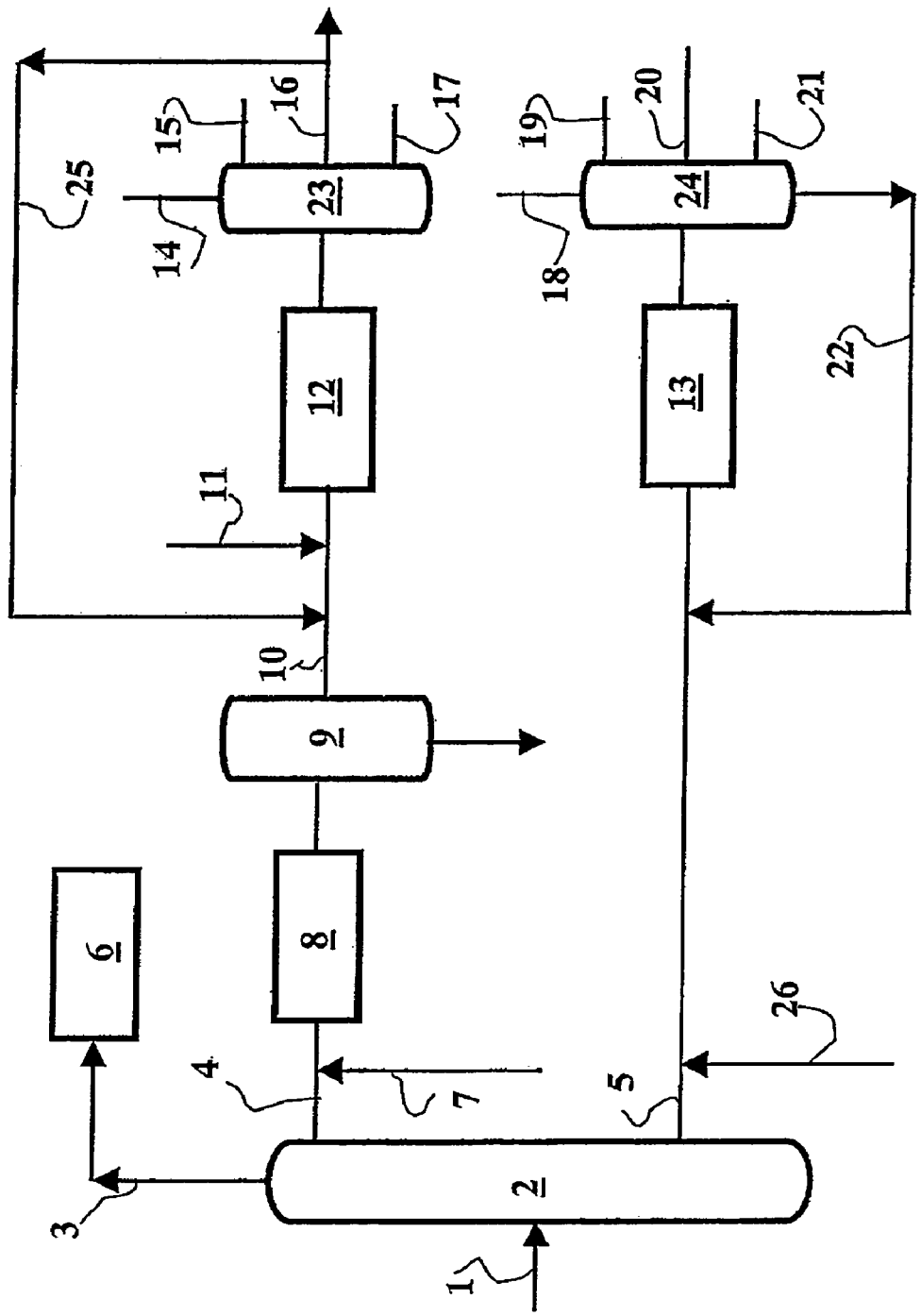

The description of this implementation is made with reference to FIG. 3 which is a non-limiting interpretation.

Step a)

The effluent from the Fischer-Tropsch synthesis arriving via line 1 is fractionated in a fractionation zone 2 into at least three fractions:

at least one light fraction (leaving via the line 3) the constituent compounds of which have boiling points below a temperature T1 in the range 120° C. to 200° C., preferably in the range 130° C. to 180° C. and more preferably at a temperature of about 150° C. In other words, the cut point is between 120° C. and 200° C.;

at least one intermediate fraction (line 4) comprising compounds with boiling points in the range between the cut point T1, as defined above, to a temperature T2 of more than 300° C., more preferably more than 350° C. and less than 410° C. or preferably less than 370° C.;

at least one heavy fraction (line 5) comprising compounds having boiling points of more than the cut point T2 as defined above.

A cut between a boiling point T1 in the range 120° C. and 200° C. and T2 of more than 300° C. and less than 370° C. is preferred. The 370° C. cut is more preferable, i.e. the heavy fraction is a 370° C.+ cut.

Cutting at 370° C. can separate at least 90% by weight of the oxygen-containing compounds and olefins, usually at least 95% by weight. The heavy cut to be treated is then purified and elimination of heteroatoms or unsaturations by hydrotreatment is then not necessary.

Fractionation is carried out here by distillation, but it may be carried out in one or more steps and using means other than distillation.

Said fractionation may be carried out using methods which are well known to the skilled person, such as flash, distillation, etc.

The light fraction is not treated using the process of the invention but may, for example, constitute a good feed for a petrochemical unit and more particularly for a steam cracker (steam cracking unit 6).

The heavier fractions described above are treated using the process of the invention.

Step b)

Said intermediate fraction is admitted via line 4, in the presence of hydrogen supplied via pipe 7, into a hydrotreatment zone 8 containing a hydrotreatment catalyst. The aim of said hydrotreatment is to reduce the amount of unsaturated olefinic compounds and to hydrotreat the oxygen-containing compounds (alcohols) present.

The catalysts used in this step b) are non-cracking or slightly cracking hydrotreatment catalysts comprising at least one metal from group VIII and/or group VI of the periodic table.

Advantageously, at least one element selected from P, B and Si is deposited on the support.

Said catalysts may be prepared using any method which is known to the skilled person or may be acquired from firms specialized in the fabrication and sale of catalysts.

In the hydrotreatment reactor 8, the feed is brought into contact in the presence of hydrogen and catalyst at temperatures and operating pressures that can carry out hydrodeoxygenation (HDO) of alcohols and hydrogenation of olefins present in the feed. The reaction temperatures used in the hydrotreatment reactor are in the range 100° C. to 350° C., preferably in the range 150° C. to 300° C., more preferably in the range 150° C. to 275° C. and still more preferably in the range 175° C. to 250° C. The total pressure range used varies from 5 to 150 bars, preferably 10 to 100 bars and more preferably between 10 and 90 bars. The hydrogen which supplies the hydrotreatment reactor is introduced at a rate such that the hydrogen/hydrocarbon volume ratio is in the range 100 to 3000 Nl/l/h, preferably in the range 100 to 2000 Nl/l/h and more preferably in the range 250 to 1500 Nl/l/h. The flow rate of the feed is such that the hourly space velocity is in the range 0.1 to 10 $h^{-1}$, preferably in the range 0.2 to 5 $h^{-1}$, and more preferably in the range 0.2 to 3 $h^{-1}$. Under these conditions, the amount of unsaturated molecules and oxygen-containing molecules is reduced to less than 0.5% and in general to less than 0.1%. The hydrotreatment step is carried out under conditions such that the conversion into products having boiling points of 370° C. or more into products having boiling points of less than 370° C. is limited to 30% by weight, preferably less than 20% and still more preferably less than 10%.

Step c)

The effluent from the hydrotreatment reactor is optionally introduced into a zone 9 for removing water which is aimed at eliminating at least part of the water produced during the hydrotreatment reactions. This water elimination may be carried out with or without eliminating the $C_4$— gas fraction which is generally produced during the hydrotreatment step. The term "elimination of water" means eliminating the water produced by the hydrodeoxygenation reactions (HDO) of alcohols, but it may also include eliminating at least a portion of the hydrocarbon saturation water. Water may be eliminated using any method and technique known to the skilled person, for example by drying, passage over a dessicant, flash, decanting, etc.

Step d)

The optionally dried fraction is then introduced (line 10), along with an optional stream of hydrogen (line 11), into zone 12 containing the hydroisomerization/hydrocracking catalyst. A further possibility of the process of the invention consists of sending all of the effluent leaving the hydrotreatment reactor (without drying) to the reactor containing the hydrocracking/hydrocracking catalyst, preferably at the same time as a stream of hydrogen.

The operating conditions in which said step d) is carried out are as follows:

The pressure is maintained at between 2 and 150 bars, preferably between 5 and 100 bars and advantageously 10 to 90 bars, the space velocity is in the range 0.1 $h^{-1}$ to 10 $h^{-1}$, preferably in the range 0.2 to 7 $h^{-1}$ and advantageously between 0.5 and 5.0 $h^{-1}$. The hydrogen flow rate is in the range 100 to 2000 normal liters of hydrogen per liter of feed per hour, preferably in the range 150 to 1500 liters of hydrogen per liter of feed.

The temperature used in this step is in the range 200° C. to 450° C., preferably 250° C. to 450° C., advantageously 300° C. to 450° C., and more advantageously more than 320° C. or, for example, between 320-420° C.

The two steps, hydrotreatment and hydroisomerization-hydrocracking, may be carried out on the two types of catalysts in two or more different reactors, and/or in the same reactor.

Hydroisomerization and hydrocracking step d) is advantageously carried out under conditions such that the conversion per pass of products with a boiling point of 150° C. or more into products having boiling points of less than 150° C. is as low as possible, preferably less than 50%, more preferably less than 30%, and can produce middle distillates (gas oil and kerosene) having cold properties (pour point and freezing point) which are sufficiently good to satisfy current specifications for this type of fuel.

In this step d), hydroisomerization rather than hydrocracking is intended to be favoured.

Step f)

Said heavy fraction with boiling points which are higher than the cut point T2 as defined above is introduced via line 5 into the zone 13 where, in the presence of hydrogen 26, it is brought into contact with a non-zeolitic hydroisomerization/hydrocracking catalyst to produce a middle distillate cut (kerosene+gas oil) having good cold properties.

The catalyst used in zone 13 of step f) to carry out the hydrocracking and hydroisomerization reactions of the heavy fraction as defined in the invention is of the same type as that present in the reactor 12. However, it should be noted that the catalysts used in reactors 12 and 13 may be identical or different.

During said step f), the fraction entering the reactor undergoes, when in contact with the catalyst and in the presence of hydrogen, essentially hydrocracking reactions which, accompanied by n-paraffin hydroisomerization reactions, will improve the quality of the products formed and more particularly the cold properties of the kerosene and gas oil, and can also produce very good distillate yields. The conversion of products having boiling points of 370° C. or more into products with a boiling point of less than 370° C. is more than 80% by weight, usually at least 85% and preferably 88% or more. In contrast, the conversions of products with boiling points of 260° C. or more into products with a boiling point of less than 260° C. is at most 90% by weight, generally at most 70% or 80%, and preferably at most 60% by weight.

In this step f), then, hydrocracking is encouraged, but preferably by limiting gas oil cracking.

Step g)

The effluent from reactor 12 in step d) is sent to a distillation train which integrates atmospheric distillation and possibly vacuum distillation, and which is aimed at separating the light products inevitably formed during step d), for example ($C_1$-$C_4$) (line 14) and a gasoline cut (line 19) and to distill at least one gas oil cut (line 17) and kerosene (line 16). The gas oil and kerosene fractions may be partially recycled (line 25), jointly or separately, to the head of the hydroisomerization/hydrocracking reactor 12 of step d).

The effluent from step f) undergoes a separation step in a distillation train to separate the light products inevitably formed during step f), for example ($C_1$-$C_4$) gas (line 18) and a gasoline cut (line 19) and to distill a gas oil cut (line 21) and kerosene cut (line 20) and to distill the fraction (line 22) boiling above gas oil, i.e. with compounds which have boiling points higher than those of middle distillates (kerosene+gas oil). This fraction, the residual fraction, generally has an initial boiling point of at least 350° C., preferably more than 370° C. This non hydrocracked fraction is advantageously recycled to the head of the hydroisomerization/hydrocracking reactor of step f) (line 13).

It may be advantageous to recycle part of the kerosene and/or gas oil to step d), step f) or both. Preferably, at least one of the kerosene and/or gas oil fractions is at least partially recycled line 25) to step d) (zone 12). It can be shown that it is advantageous to recycle part of the kerosene to improve the cold properties.

Advantageously and at the same time, part of the non hydrocracked fraction is recycled to step f) (zone 13).

Clearly, the gas oil and kerosene cuts are preferably recovered separately, but the cut points are adjusted by the operator as a function of its needs.

FIG. 3 shows two distillation columns 23 and 24, but a single column may be used to treat all of the cuts from zones 12 and 13.

FIG. 3 shows only a recycle of kerosene to the catalyst of reactor 12. Clearly, part of the gas oil could be recycled (separately or with the kerosene) and preferably, over the same catalyst as the kerosene. It is also possible to recycle part of the kerosene and/or gas oil produced in lines 20, 21.

A further implementation of the invention comprises the following steps:

a) optional fractionation of the feed into at least one heavy fraction with an initial boiling point in the range 120° C. to 200° C., and at least one light fraction boiling below said heavy fraction;

b) optional hydrotreatment of at least part of the feed or heavy fraction, optionally followed by a step c);

c) eliminating at least a portion of the water;

d) passing at least part of the effluent or of the optionally hydrotreated fraction through a treatment process over a first hydroisomerization/hydrocracking catalyst containing at least one noble group VIII metal;

e) distilling the hydroisomerized/hydrocracked effluent to obtain middle distillates (kerosene, gas oil) and a residual fraction boiling above the middle distillates;

f) on a second hydroisomerization/hydrocracking catalyst containing at least one noble group VIII metal, passing through a treatment process at least a portion of said residual heavy fraction and/or a portion of said middle distillates, and distilling the resulting effluent to obtain middle distillates; and at least one of said treatment processes of step d) and f) is that of the invention.

Figure 4:
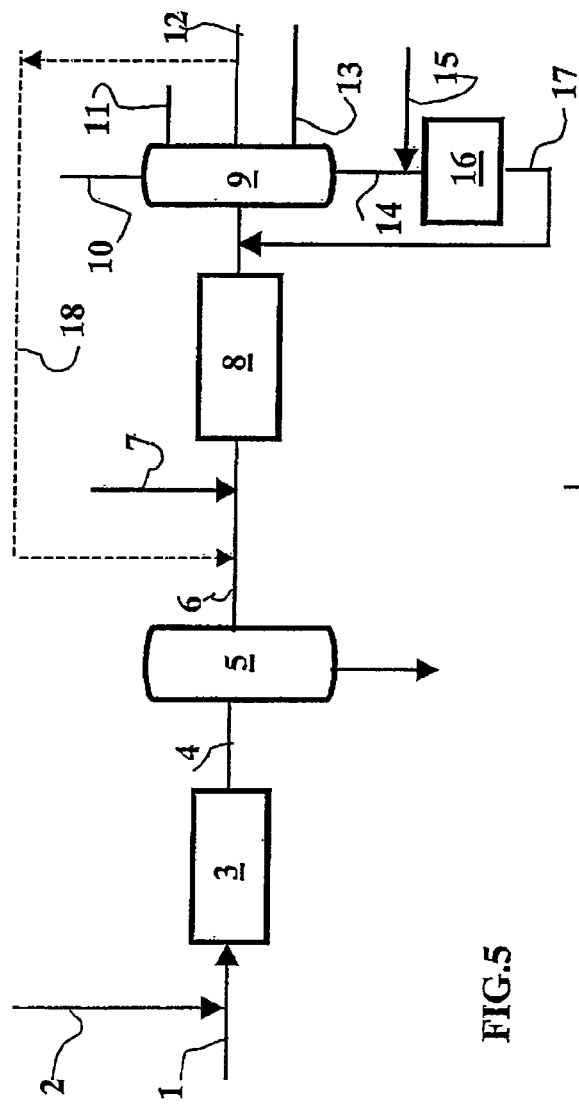
Figure 5:
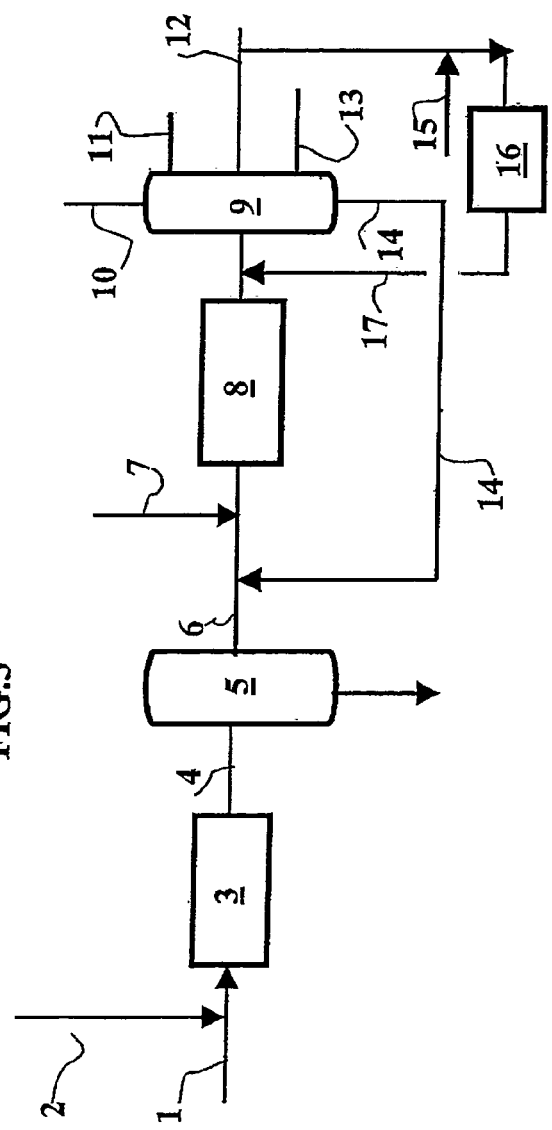

The description of this implementation mode is made by referring to FIGS. 4 and 5 which are non-limiting interpretations.

Step a)

When this step is carried out, the effluent from the Fischer-Tropsch synthesis unit is fractionated (for example by distillation) into at least two fractions: at least one light fraction and at least one heavy fraction with an initial boiling point at a temperature in the range 120° C. to 200° C., preferably in the range 130° C. to 180° C., and more preferably at a temperature of about 150° C.; in other words, the cut point is located between 120° C. and 200° C.

The heavy fraction generally has a paraffins content of at least 50% by weight.

This fractionation may be carried out using any method which is known to the skilled person, such as flash, distillation, etc. By way of non-limiting example, the effluent form the Fischer-Tropsch synthesis unit undergoes flash, decantation to eliminate water and distillation to obtain at least the 2 fractions described above.

The light fraction is not treated using the process of the invention but may, for example, constitute a good feed for petrochemistry and more preferably for a steam cracking unit. At least one heavy fraction as described above is treated using the process of the invention.

Step b)

Optionally, this fraction or at least a portion of the initial feed is admitted via line 1, in the presence of hydrogen (supplied via line 2), into a zone 3 containing a hydrotreatment catalyst which is intended to reduce the amount of unsaturated olefinic compounds and to hydrotreat the oxygen-containing compounds (alcohols) present in the heavy fraction described above.

The catalysts used in this step b) are non-cracking or slightly cracking hydrotreatment catalysts comprising at least one metal from group VIII and/or group VI of the periodic table. Advantageously, at least one element selected from P, B and Si is deposited on the support.

These catalysts may be prepared using any method which is known to the skilled person or may be acquired from firms specializing in the fabrication and sale of catalysts.

In the hydrotreatment reactor 3, the feed is brought into contact in the presence of hydrogen and catalyst at operating temperatures and pressures which can carry out hydrodeoxygenation (HDO) of alcohols and hydrogenation of olefins present in the feed. The reaction temperatures used in the hydrotreatment reactor are in the range 100° C. to 350° C., preferably in the range 150° C. to 300° C., and more preferably in the range 150° C. to 275° C., more preferably still in the range 175° C. to 250° C. The total pressure range used is 5 to 150 bars, preferably 10 to 100 bars and more preferably between 10 and 90 bars. The hydrogen which supplies the hydrotreatment reactor is introduced at a flow rate such that the hydrogen/hydrocarbon volume ratio is in the range 100 to 3000 Nl/l/h, preferably in the range 100 to 2000 Nl/l/h and more preferably in the range 250 to 1500 Nl/l/h. The flow rate of the feed is such that the hourly space velocity is in the range 0.1 to 10 $h^{-1}$, preferably in the range 0.2 to 5 $h^{-1}$ and more preferably in the range 0.2 to 3 $h^{-1}$. Under these conditions, the amount of unsaturated and oxygenated molecules is reduced to less than 0.5% and to about less than 0.1% in general. The hydrotreatment step is carried out under conditions such that the conversion of products having boiling points of 370° C. or more into products having boiling points of less than 370° C. is limited to 30% by weight, preferably less than 20% and more preferably less than 10%.

Step c)

The effluent (line 4) from hydrotreatment reactor 3 is optionally introduced into a water removal zone 5 which is aimed at eliminating at least part of the water produced during the hydrotreatment reactions. This water elimination may be carried out with or without eliminating the $C_4$— gas fraction which is generally produced during the hydrotreatment step. The term "elimination of water" means eliminating water produced by hydrodeoxygenation reactions (HDO) of alcohols, but it may also include eliminating at least a portion of the hydrocarbon saturation water. The water may be eliminated using any method and technique known to the skilled person, for example by drying, passage over a dessicant, flash, decanting, etc.

Step d)

At least a portion and preferably all of the hydrocarbon fraction (at least a portion of the feed or at least a portion of the heavy fraction from step a) or at least a portion of the hydrotreated and optionally dried feed) is then introduced (line 6), as well as an optional stream of hydrogen (line 7), into zone 8 containing said first hydroisomerization/hydrocracking catalyst. A further possibility of the process of the invention consists of sending part or all of the effluent from the hydrotreatment reactor (without drying) to the reactor containing the hydroisomerization/hydrocracking catalyst, preferably at the same time as a stream of hydrogen.

Before use in the reaction, the metal contained in the catalyst must be reduced. A preferred method for reducing the metal is treatment in hydrogen at a temperature in the range 150° C. to 650° C. and a total pressure in the range 0.1 to 25 MPa. As an example, a reduction consists of a constant temperature stage at 150° C. of 2 hours then raising the temperature to 450° C. at a rate of 1° C./min, then a constant temperature stage of 2 hours at 450° C.; during the whole of this reduction step, the hydrogen flow rate is 1000 liters of hydrogen/liter of catalyst. It should also be noted that any ex situ reduction is suitable.

The operating conditions in which said step d) is carried out are as follows:

The pressure is maintained at between 2 and 150 bars, preferably between 5 and 100 bars and advantageously 10 to 90 bars; the space velocity is in the range 0.1 $h^{-1}$, to 10 $h^{-1}$, preferably in the range 0.2 to 7 $h^{-1}$ and advantageously between 0.5 and 5.0 $h^{-1}$. The hydrogen flow rate is in the range 100 to 2000 normal liters of hydrogen per liter of feed per hour, preferably in the range 150 to 1500 liters of hydrogen per liter of feed.

The temperature used in this step is in the range 200° C. to 450° C., preferably 250° C. to 450° C., advantageously 300° C. to 450° C., and more advantageously more than 320° C. or, for example, between 320-420° C.

The two steps, hydrotreatment and hydroisomerization/hydrocracking, may be carried out on the two types of catalyst in two or more different reactors and/or in the same reactor.

Step e)

The hydrocracked/hydroisomerized effluent from the outlet from the reactor 8, step d), is sent to a distillation train 9 which integrates atmospheric distillation and possibly vacuum distillation, and which is aimed at separating conversion products with a boiling point of less than 340° C., preferably less than 370° C. and including those formed during step d) in the reactor 8, and to separate the residual fraction the initial boiling point of which is generally more than at least 340° C. and preferably more than at least 370° C. Of the converted and hydroisomerized products, in addition to the light $C_1$-$C_4$ gases (line 10), at least one gasoline fraction (line 11) is separated, and at least one kerosene middle distillate fraction (line 12) and gas oil fraction (line 13) are separated.

Step f)

The process of the invention uses a second zone 16 containing a hydroisomerization/hydrocracking catalyst (termed the second catalyst). An effluent selected from a portion of the kerosene produced (line 12), a portion of the gas oil (line 13) and the residual fraction, preferably the residual fraction with an initial boiling point of generally more than at least 370° C., is passed over this catalyst in the presence of hydrogen (line 15).

The catalyst present in the reactor 16 of step f) of the process of the invention is, in the same manner as for step d), of the non-zeolitic acid type based on at least one noble metal from group VIII; however, it may be identical or different from that of step d).

During said step, the fraction entering reactor 16 undergoes, in contact with the catalyst and in the presence of hydrogen, hydroisomerization and/or hydrocracking reactions which will improve the quality of the products formed, more particularly the cold properties of kerosene and gas oil, to obtain distillate yields which are improved over the prior art.

The choice of operating conditions allows the quality of the products (middle distillates), in particular the cold properties, to be finely adjusted.

The operating conditions under which said step f) is carried out are as follows:

The pressure is maintained at between 2 and 150 bars, preferably between 5 and 100 bars and advantageously 10 to 90 bars; the space velocity is in the range 0.1 $h^{-1}$ to 10 $h^{-1}$, preferably in the range 0.2 to 7 $h^{-1}$ and advantageously between 0.5 and 5.0 $h^{-1}$. The hydrogen flow rate is in the range 100 to 2000 normal liters of hydrogen per liter of feed per hour, preferably in the range 150 to 1500 liters of hydrogen per liter of feed.

The temperature used in this step is in the range 200° C. to 450° C., preferably 250° C. to 450° C., advantageously 300° C. to 450° C., more advantageously more than 320° C. or, for example, 320-420° C.

The operator will adjust the operating conditions on the first and second hydrocracking/hydroisomerization catalyst to obtain the desired product quality and yield.

Thus, in general, for the first catalyst, the conversion per pass of products with a boiling point of 150° C. or more to products with boiling points less than 150° C. is less than 50% by weight, preferably less than 30% by weight. These conditions can in particular allow the kerosene/gas oil ratio produced to be adjusted, as well as the cold properties of the middle distillates, in particular of kerosene.

Again generally, for the second catalyst, when the residual fraction is treated, the conversion per pass of products with a boiling point of 370° C. or more to products with a boiling point of less than 370° C. is more than 40% by weight, preferably more than 50% by weight, or more preferably more than 60% by weight. It may also be advantageous to produce conversions of at least 80% by weight.

When a portion of the kerosene and/or gas oil is treated on the second catalyst, the conversion per pass of products with a boiling point of 150° C. or more to products with a boiling point of less than 150° C. is less than 50% by weight, preferably less than 30% by weight.

In general, the operating conditions applied in reactors 8 and 16 may be different or identical. Preferably, the operating conditions used in the two hydroisomerization/hydrocracking reactors are different in terms of operating pressure, temperature, contact time (HSV) and $H_2$/feed ratio. This implementation allows the operator to adjust the quality and/or yield of kerosene and gas oil.

The effluent from reactor 16 is then sent via line 17 to a distillation train to separate the conversion products, namely gasoline, kerosene and gas oil.

FIG. 4 shows an implementation with the residual fraction (line 14) passing into the hydroisomerization/hydrocracking zone 16 (step f), the effluent obtained being sent (line 17) to the separation zone 9.

Advantageously, at the same time, the kerosene and/or gas oil may be partially recycled (line 18) to the hydroisomerization/hydrocracking zone (step d) over the first catalyst.

In FIG. 5, a portion of the kerosene and/or gas oil produced passes into the hydroisomerization/hydrocracking zone 16 (step f), the effluent obtained being sent (line 17) to the separation zone 9.

At the same time, the residual fraction (line 14) is recycled to the hydroisomerization/hydrocracking zone 8 (step d)) over the first catalyst.

It has been established that it is advantageous to recycle a portion of the kerosene to a hydrocracking/hydroisomerization catalyst to improve the cold properties.

In FIGS. 4 and 5, we show only a kerosene recycle. Clearly, a portion of the gas oil could be recycled (separately or with the kerosene), preferably over the same catalyst as the kerosene.

The invention may also be used in other implementations to produce middle distillates.

As an example, one implementation includes hydrotreatment of an effluent from the Fischer-Tropsch synthesis as a whole or after separating the $C_4$— fraction (preferably, conversion of products with boiling points of more than 370° C. is less than 20%), optional separation of the $C_4$— fraction of the hydrotreatment effluent and at least a portion of the residual effluent is treated by the process of the invention (conversion is preferably at least 40%). In a further implementation, the effluent from the Fischer-Tropsch synthesis is separated into a heavy fraction (preferably boiling above 260° C.) and at least one light fraction (preferably boiling below 260° C.), the heavy fraction is treated by the process of the invention, at least one light fraction is hydrotreated then hydrocracked/isomerized, preferably using the process of the invention.

In a further implementation of the invention, the process may be used to produce middle distillates, essentially in the absence of oxygen-containing organic compounds, from a synthetic mixture of partially oxygenated hydrocarbons from the Fischer-Tropsch synthesis process, substantially straight-chain, containing at least 20% by weight of a fraction having a distillation temperature of more than 370° C. The process then comprises the following steps:

a) separating said mixture into at least one fraction with a low boiling point B (generally with a maximum boiling point of 150° C. to 380° C., preferably 260° C. to 370° C.) which is richer in oxygen-containing compounds, and at least one fraction with a high boiling point A which is less rich in oxygen-containing compounds (generally with a boiling point of more than 370° C., optionally comprising at least a portion of a gas oil type cut);

b) subjecting said fraction B to a hydrogenating treatment under conditions which avoid any substantial variation in its mean molecular weight, to obtain a hydrogenated substantially non oxygen-containing mixture of hydrocarbons;

c) recombination of at least a portion of said hydrogenated mixture of step b) with said fraction A to form a mixture C of straight-chain hydrocarbons with a reduced oxygenated hydrocarbons content and subjecting said mixture C to a hydrocracking treatment of the invention in the presence of a hydroisomerization/hydrocracking catalyst, to convert at least 40% of said fraction with a high boiling point into a hydrocarbon fraction which can be distilled at a temperature of less than 370° C.;

d) separating at least one fraction of the hydrocarbons from the product obtained in step c) which has a distillation temperature in the middle distillates range.

Figure 6:
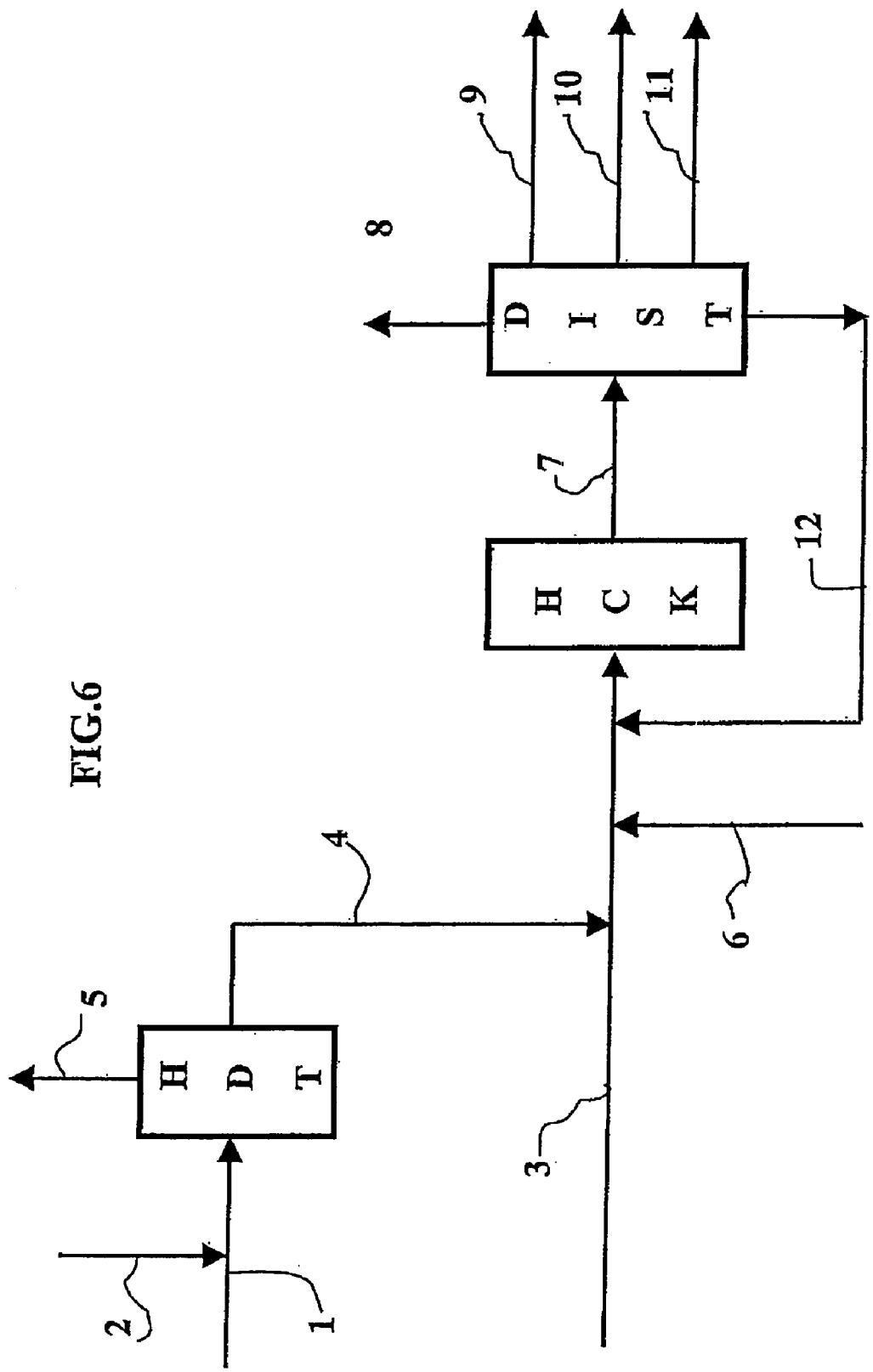

The description of this implementation will be made with reference to FIG. 6, although this Figure does not limit the interpretation.

A synthetic stream of substantially straight-chain hydrocarbons, partially oxygenated or essentially free of sulphur obtained from a Fischer-Tropsch type process, preferably of the "non shifting" type, is removed from the synthesis reactor previously subdivided into a fraction boiling at a high boiling point A, with an initial boiling point of 200° C. to 450° C., and a fraction with a low boiling point B, with an end point of 200° C. to 450° C. The mass ratio B/A between the two fractions is preferably in the range 0.5 to 2.0, more preferably in the range 0.8 to 1.5 and if necessary, the composition of the two fractions may partially coincide, with a hydrocarbon cut present in the two fractions, preferably with a quantity of 0.1% to 20% by weight with respect to the total weight of each fraction.

The fraction with a low boiling point B is charged via a line 1 into the hydrogenation unit (HDT) to carry out step b) of the present implementation, in which it is brought into contact with hydrogen (line 2) in the presence of a suitable catalyst, under conditions that can minimize or exclude the hydrocracking reaction.

A hydrocarbon fraction produced in the hydrogenation step having an oxygen content of less than 0.001% by weight (with a hydrocarbon fraction gas $C_5$—) is advantageously separated and removed via line 5. This fraction, however, does not represent more than 5%, preferably no more than 3% by weight of the total fraction B.

A fraction with a low boiling point is thus obtained, essentially constituted by a mixture of saturated hydrocarbons, preferably partially isomerized, which is at least in part, preferably completely added via line 4 to fraction A (line 3) of hydrocarbons with a high boiling point with a low oxygen content to form a feed C which supplies a hydrocracking unit (HCK) in step c) of the present implementation of the invention.

The following streams are introduced into the hydrocracking unit (HCK):

the feed C, obtained by adding the fraction A and the fraction resulting from hydrogenation pretreatment of the fraction B, via line 4;

the high boiling point fraction recycled via line 12, preferably having a boiling point of more than 360° C., forming the residue from the middle distillates separation, in a mass ratio which is preferably in the range 1% to 40%, more preferably 5% to 15% with respect to said feed C;

a sufficient quantity of hydrogen via line 6.

The product from the hydrocracking step, composed of a mixture of hydrocarbons with a degree of isomerization (non linear hydrocarbons/mass of mixture) which is preferably over 50%, more preferably over 70%, is introduced via line 7 to a distillation separation step (DIST), preferably a column operating at atmospheric pressure or slightly above, from which the envisaged distillates are withdrawn via lines 10

(kerosene) and 11 (gas oil). In FIG. 6, the following products are also obtained in a distillation unit: a $C_1$-$C_5$ gas fraction, relatively insignificant, via line 8, and a light hydrocarbon fraction, via line 9, preferably with a boiling point of less than 150° C. (naphtha) which is formed in step c).

The Products Obtained

The gas oil(s) obtained has(have) a boiling point of at most 0° C., generally less than −10° C. and often less than −15° C. The cetane index is over 60, generally over 65, usually over 70.

The kerosene(s) obtained has(have) a freezing point of at most −35° C., generally less than −40° C. The smoke point is over 25 mm, generally over 30 mm. In this process, the production of gasoline (not wanted) is as low as possible. The gasoline yield remains less than 50% by weight, preferably less than 40% by weight, advantageously less than 30% by weight or even less than 20% by weight or even less than 15% by weight.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding International Application No. PCT/FR06/00535, filed Mar. 10, 2006, and French Application Serial No. 05/03.600, filed Apr. 11, 2005, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

EXAMPLE 1

Preparation and Forming of an Alumina-silica (SA1) in Accordance with the Invention A support SA1 was obtained as follows.

Alumina-silica gels were prepared by mixing sodium silicate with water and passing this mixture over an ion exchange resin. A solution of aluminium chloride hexahydrate in water was added to the decationized silica sol. To obtain a gel, ammonia was added, the precipitate obtained was filtered and washing was carried out with a solution of water and concentrated ammonia until the conductivity of the washing water was a constant. The gel from this step was mixed with Pural boehmite powder so that the final composition of the mixed support as the anhydrous product was, at this stage of the synthesis, 70% $Al_2O_3$-30% $SiO_2$. This suspension was fed into a colloidal mill in the presence of nitric acid. The amount of nitric acid added was adjusted so that the percentage of nitric acid at the outlet from the mill was 8% with respect to the mass of solid mixed oxide. This mixture was then filtered to reduce the quantity of water in the mixed cake. The cake was then ground in the presence of 10% nitric acid then extruded. Mixing was carried out in a Z arm mixer. Extrusion was carried out by passing the paste through a die provided with 1.4 mm diameter orifices. The extrudates obtained were dried at 150° C., calcined at 550° C. then calcined at 700° C. in the presence of steam.

The support SA1 had the following characteristics:

The composition of the support SA1 of silica-alumina was 68% $Al_2O_3$ and 32% $SiO_2$;

The BET specific surface area was 233 $m^2/g$;

The total pore volume, measured by nitrogen adsorption, was 0.38 ml/g;

The total pore volume, measured by mercury porosimetry, was 0.37 ml/g;

The mean pore diameter, measured by mercury porosimetry, was 69 Å;

The ratio between the volume V2, measured by mercury porosimetry, included between $D_{mean}$−30 Å and $D_{mean}$+30 Å, and the total pore volume, measured by mercury porosimetry, was 0.95;

The volume V3, measured by mercury porosimetry, included in pores with diameters of more than $D_{mean}$+30 Å, was 0.018 ml/g;

The volume V6, measured by mercury porosimetry, included in pores with diameters of more than $D_{mean}$+15 Å, was 0.021 ml/g;

The ratio between the adsorption surface area and the BET surface area was 0.83;

The pore volume, measured by mercury porosimetry, included in pores with diameters of more than 140 Å, was 0.01 ml/g;

The pore volume, measured by mercury porosimetry, included in pores with diameters of more than 160 Å, was 0.01 ml/g;

The pore volume, measured by mercury porosimetry, included in pores with diameters of more than 200 Å, was 0.01 ml/g;

The pore volume, measured by mercury porosimetry, included in pores with diameters of more than 500 Å, was 0.006 ml/g;

The ratio B/L Of the support was 0.11;

The X ray diffraction diagram contained the characteristic principal peaks of gamma alumina and in particular, it contained peaks with a d in the range 1.39 to 1.40 Å and with a d in the range 1.97 Å to 2.00 Å.

The atomic sodium content was 200±20 ppm. The atomic sulphur content was 800 ppm.

The solid $^{27}$Al MAS NMR spectra of the catalysts had two distinct masses of peaks. A first type of aluminium with a maximum resonating around 10 ppm extended between −100 and 20 ppm. The position of the maximum suggests that these species are essentially of type $Al_{VI}$ (octahedral). A second minor type of aluminium with a maximum resonating around 60 ppm extends between 20 and 100 ppm. This mass may be decomposed into at least two species. The predominant species of this mass corresponds to $Al_{IV}$ atoms (tetrahedral). The proportion of octahedral $Al_{VI}$ was 70%.

The support contained two aluminosilicate zones, said zones having Si/Al ratios lower than or higher than the overall Si/Al ratio determined by X ray fluorescence. One of the zones had a Si/Al ratio, determined by TEM, of 0.35.

EXAMPLE 2

Preparation and Forming of an Alumina-silica in Accordance with the Invention (SA2)

An alumina hydrate was prepared in accordance with the disclosure in U.S. Pat. No. 3,124,418. After filtering, the freshly prepared precipitate was mixed with a silicic acid solution prepared by exchange on a decationizing resin. The proportions of the two solutions were adjusted to produce a composition of 70% Al$_2$O$_3$-30% SiO$_2$ on the final support. This mixture was rapidly homogenized in a commercially available colloidal mill in the presence of nitric acid so that the nitric acid content of the suspension at the outlet from the mill was 8% with respect to the mixed silica-alumina solid. The suspension was then dried conventionally in a spray drier in a conventional manner from 300° C. to 60° C. The prepared powder was formed in a Z arm mixer in the presence of 3% nitric acid with respect to the anhydrous product. Extrusion was carried out by passing the paste through a die provided with 1.4 mm diameter orifices. The extrudates obtained were dried at 150° C., calcined at 550° C. then calcined at 750° C. in the presence of steam.

The support SA2 had the following characteristics:

The composition of the silica-alumina support was 71% Al$_2$O$_3$ and 29% SiO$_2$;

The BET specific surface area was 264 m$^2$/g;

The total pore volume, measured by nitrogen adsorption, was 0.39 ml/g;

The total pore volume, measured by mercury porosimetry, was 0.35 ml/g;

The mean pore diameter, measured by mercury porosimetry, was 59 Å;

The ratio between the volume V2, measured by mercury porosimetry, included between D$_{mean}$−30 Å and D$_{mean}$+30 Å, and the total pore volume, measured by mercury porosimetry, was 0.87;

The volume V3, measured by mercury porosimetry, included in pores with diameters of more than D$_{mean}$+30 Å, was 0.045 ml/g;

The volume V6, measured by mercury porosimetry, included in pores with diameters of more than D$_{mean}$+15 Å, was 0.05 ml/g;

The ratio between the adsorption surface and the BET surface area was 0.90;

The pore volume, measured by mercury porosimetry, included in pores with diameters of more than 140 Å, was 0.040 ml/g;

The pore volume, measured by mercury porosimetry, included in pores with diameters of more than 160 Å, was 0.0385 ml/g;

The pore volume, measured by mercury porosimetry, included in pores with diameters of more than 200 Å, was 0.038 ml/g;

The pore volume, measured by mercury porosimetry, included in pores with diameters of more than 500 Å, was 0.032 ml/g;

The X ray diffraction diagram contained the characteristic principal peaks of gamma alumina and in particular, it contained peaks with a d in the range 1.39 to 1.40 Å and with a d in the range 1.97 Å to 2.00 Å.

The ratio B/L of the support was 0.11.

The atomic sodium content was 250±20 ppm. The atomic sulphur content was 2000 ppm.

The solid $^{27}$Al MAS NMR spectra of the catalysts had two distinct masses of peaks. A first type of aluminium with a maximum resonating around 10 ppm extended between −100 and 20 ppm. The position of the maximum suggests that these species are essentially of type Al$_{VI}$ (octahedral). A second minor type of aluminium with a maximum resonating around 60 ppm extends between 20 and 100 ppm. This mass may be decomposed into at least two species. The predominant species of this mass corresponds to Al$_{IV}$ atoms (tetrahedral). The proportion of octahedral Al$_{VI}$ was 69%.

The support contained two aluminosilicate zones, said zones having Si/Al ratios lower than or higher than the overall Si/Al ratio determined by X ray fluorescence. One of the zones had a Si/Al ratio, determined by TEM, of 0.35.

EXAMPLE 3

Preparation and Forming of an Alumina-silica in Accordance with the Invention (SA3)

Aluminium hydroxide powder was prepared in accordance with the process described in WO-A-00/01617. The mean particle size of the aluminium hydroxide particles, measured by laser granulometry, was 40 microns. This powder was mixed with a silica sol prepared by exchange on a decationizing resin, then filtered over a resin with a porosity of 2. The concentrations of silica sol and aluminium hydroxide powder were adjusted to obtain a final composition of 60% Al$_2$O$_3$ and 40% SiO$_2$. Forming was carried out in the presence of 8% nitric acid with respect to the anhydrous product. Mixing was carried out in a Z arm mixer. Extrusion was carried out by passing the paste through a die provided with 1.4 mm diameter orifices. The extrudates obtained were dried at 150° C., calcined at 550° C. then calcined at 700° C. in the presence of steam.

The characteristics of the support were as follows:

The composition of the silica-alumina support was 59.7% Al$_2$O$_3$ and 40.3% SiO$_2$;

The BET specific surface area was 253 m$^2$/g;

The total pore volume, measured by nitrogen adsorption, was 0.4 ml/g;

The total pore volume, measured by mercury porosimetry, was 0.4 ml/g;

The mean pore diameter, measured by mercury porosimetry, was 51 Å;

The ratio between the volume V2, measured by mercury porosimetry, included between D$_{mean}$−30 Å and D$_{mean}$+30 Å, and the total pore volume, measured by mercury porosimetry, was 0.9;

The volume V3, measured by mercury porosimetry, included in pores with diameters of more than D$_{mean}$+30 Å, was 0.072 ml/g;

The volume V6, measured by mercury porosimetry, included in pores with diameters of more than D$_{mean}$+15 Å, was 0.087 ml/g;

The ratio between the adsorption surface and the BET surface area was 0.83;

The pore volume, measured by mercury porosimetry, included in pores with diameters of more than 140 Å, was 0.055 ml/g;

The pore volume, measured by mercury porosimetry, included in pores with diameters of more than 160 Å, was 0.053 ml/g;

The pore volume, measured by mercury porosimetry, included in pores with diameters of more than 200 Å, was 0.051 ml/g;

The pore volume, measured by mercury porosimetry, included in pores with diameters of more than 500 Å, was 0.045 ml/g;

The ratio B/L of the support was 0.12.

The X ray diffraction diagram contained the characteristic principal peaks of gamma alumina and in particular, it contained peaks with a d in the range 1.39 to 1.40 Å and with a d in the range 1.97 Å to 2.00 Å.

The atomic sodium content was 200±20 ppm. The atomic sulphur content was 800 ppm.

The solid $^{27}$Al MAS NMR spectra of the catalysts had two distinct masses of peaks. A first type of aluminium with a maximum resonating around 10 ppm extended between −100 and 20 ppm. The position of the maximum suggests that these species are essentially of type $Al_{VI}$ (octahedral). A second minor type of aluminium with a maximum resonating around 60 ppm extends between 20 and 100 ppm. This mass may be decomposed into at least two species. The predominant species of this mass corresponds to $Al_{IV}$ atoms (tetrahedral). The proportion of octahedral $Al_{VI}$ was 70%.

The support contained two aluminosilicate zones, said zones having Si/Al ratios lower than or higher than the overall Si/Al ratio determined by X ray fluorescence. One of the zones had a Si/Al ratio, determined by TEM, of 0.4.

EXAMPLE 4

Preparation of Hydrocracking Catalysts for Use in the Process of the Invention (C1, C2, C3, C4)

Catalyst C1 was obtained by dry impregnation of support SA-1 (in the form of extrudates) prepared in Example 1, by an aqueous solution of phosphoric acid $H_3PO_4$ and by a solution of hexachloroplatinic acid $H_2PtCl_6$ dissolved in a volume of solution corresponding to the total pore volume to be impregnated. The impregnated extrudates were then calcined at 550° C. in air for 4 hours. The platinum content was 0.48% by weight and its dispersion, measured by $H_2$—$O_2$ titration, was 82%; its distribution was uniform in the extrudates. The $P_2O_5$ content was 1%.

Catalyst C2 was obtained by dry impregnation of support SA-2 (in the form of extrudates) prepared in Example 2, by an aqueous solution of phosphoric acid $H_3PO_4$ then by a solution of platinum tetramine $Pt(NH_3)_4Cl_2$ dissolved in a volume of solution corresponding to the total pore volume to be impregnated. The impregnated extrudates were then calcined at 550° C. in air for 4 hours. The platinum content was 0.57% by weight and its dispersion, measured by $H_2$—$O_2$ titration, was 62%; its distribution was uniform in the extrudates. The $P_2O_5$ content was 1%.

Catalyst C3 was obtained by dry impregnation of support SA-3 (in the form of extrudates) prepared in Example 3 by an aqueous solution of phosphoric acid $H_3PO_4$ and by a solution of hexachloroplatinic acid $H_2PtCl_6$ dissolved in a volume of solution corresponding to the total pore volume to be impregnated. The impregnated extrudates were then calcined at 550° C. in air for 4 hours. The platinum content was 0.41% by weight and its dispersion, measured by $H_2$—$O_2$ titration, was 88%; its distribution was uniform in the extrudates. The $P_2O_5$ content was 1%.

EXAMPLE 5

Preparation of Catalysts C4 and C5, not in Accordance with the Invention

Catalyst C4 was obtained by dry impregnation of support SA-2 (in the form of extrudates) prepared in Example 1 by a solution of hexachloroplatinic acid $H_2PtCl_6$ dissolved in a volume of solution corresponding to the total pore volume to be impregnated. The impregnated extrudates were then calcined at 550° C. in air for 4 hours. The platinum content was 0.48% by weight and its dispersion, measured by $H_2$—$O_2$ titration, was 82%; its distribution was uniform in the extrudates. Catalyst C4 contained no doping element.

Catalyst C5 was obtained by dry impregnation of support SA-2 (in the form of extrudates) prepared in Example 2 by an aqueous solution of phosphoric acid $H_3PO_4$ then by a solution of platinum tetramine dichloride $Pt(NH_3)_4Cl_2$ dissolved in a volume of solution corresponding to the total pore volume to be impregnated. The impregnated extrudates were then calcined at 550° C. in air for 4 hours. The platinum content was 0.57% by weight and its dispersion, measured by $H_2$—$O_2$ titration, was 62%; its distribution was uniform in the extrudates. The $P_2O_5$ content of catalyst C5 was 7%.

EXAMPLE 6

Preparation of Catalyst C6, in Accordance with the Invention

Catalyst C6 was obtained by dry impregnation of support SA-2 (in the form of extrudates) prepared in Example 1 by an aqueous solution of phosphoric acid $H_3PO_4$ and by a solution of hexachloroplatinic acid $H_2PtCl_6$ dissolved in a volume of solution corresponding to the total pore volume to be impregnated. After aging and drying, the impregnated extrudates were calcined at 550° C. in air for 4 hours. The platinum content was 0.50% by weight and its dispersion, measured by $H_2$—$O_2$ titration, was 83%; its distribution was uniform in the extrudates. The $P_2O_5$ content was 2% by weight.

The textural properties of catalyst C6 were as follows:

The BET specific surface area was 252 m$^2$/g;

The total pore volume, measured by nitrogen adsorption, was 0.38 ml/g;

The total pore volume, measured by mercury porosimetry, was 0.37 ml/g;

The mean pore diameter, measured by mercury porosimetry, was 58 Å;

The ratio between the volume V2, measured by mercury porosimetry, included between $D_{mean}$−30 Å and $D_{mean}$+30 Å, and the total pore volume, measured by mercury porosimetry, was 0.87;

The volume V3, measured by mercury porosimetry, included in pores with diameters of more than $D_{mean}$+30 Å, was 0.045 ml/g;

The volume V6, measured by mercury porosimetry, included in pores with diameters of more than $D_{mean}$+15 Å, was 0.05 ml/g;

The ratio between the adsorption surface and the BET surface area was 0.90;

The pore volume, measured by mercury porosimetry, included in pores with diameters of more than 140 Å, was 0.04 ml/g;

The pore volume, measured by mercury porosimetry, included in pores with diameters of more than 160 Å, was 0.0385 ml/g;

The pore volume, measured by mercury porosimetry, included in pores with diameters of more than 200 Å, was 0.038 ml/g;

The pore volume, measured by mercury porosimetry, included in pores with diameters of more than 500 Å, was 0.032 ml/g.

EXAMPLE 7

Preparation of Catalyst C7, in Accordance with the Invention

Catalyst C7 was obtained by dry impregnation of support SA-2 (in the form of extrudates) prepared in Example 1 by an aqueous solution of phosphoric acid $H_3PO_4$ and by an aqueous solution of palladium chloride $PdCl_2$ dissolved in a volume of solution corresponding to the total pore volume to be impregnated. After aging and drying, the impregnated extrudates were calcined at 550° C. in air for 4 hours. The platinum content was 1.0% by weight and its dispersion, measured by CO chemisorption, was 82%; its distribution was uniform in the extrudates. The $P_2O_5$ content was 2.0% by weight.

The textural properties of catalyst C7 were as follows:
The BET specific surface area was 253 m²/g;
The total pore volume, measured by nitrogen adsorption, was 0.38 ml/g;
The total pore volume, measured by mercury porosimetry, was 0.37 ml/g;
The mean pore diameter, measured by mercury porosimetry, was 58 Å;
The ratio between the volume V2, measured by mercury porosimetry, included between $D_{mean}-30$ Å and $D_{mean}+30$ Å, and the total pore volume, measured by mercury porosimetry, was 0.87;
The volume V3, measured by mercury porosimetry, included in pores with diameters of more than $D_{mean}+30$ Å, was 0.045 ml/g;
The volume V6, measured by mercury porosimetry, included in pores with diameters of more than $D_{mean}+15$ Å, was 0.05 ml/g;
The ratio between the adsorption surface and the BET surface area is 0.90;
The pore volume, measured by mercury porosimetry, included in pores with diameters of more than 140 Å, was 0.04 ml/g;
The pore volume, measured by mercury porosimetry, included in pores with diameters of more than 160 Å, was 0.0385 ml/g;
The pore volume, measured by mercury porosimetry, included in pores with diameters of more than 200 Å, was 0.038 ml/g;
The pore volume, measured by mercury porosimetry, included in pores with diameters of more than 500 Å, was 0.032 ml/g.

EXAMPLE 8

Preparation of Catalyst C8, in Accordance with the Invention

Catalyst C8 was obtained by dry impregnation of support SA-2 (in the form of extrudates) prepared in Example 1 by an aqueous solution of phosphoric acid $H_3PO_4$, hydrogen peroxide $H_2O_2$, ammonium metatungstate $(NH_4)6H_2W_{12}O_{40}$ and nickel nitrate $Ni(NO_3)_2$. The quantity of hydrogen peroxide in the aqueous solution was such that the mole ratio between the hydrogen peroxide and the ammonium metatungstate was 0.15 mol/mol. After aging and drying, the impregnated extrudates were calcined at 550° C. in air for 4 hours. The tungsten oxide $WO_3$ content was 24.0% by weight, the nickel oxide content NiO was 3.1% by weight, the $P_2O_5$ content was 1.9% by weight. The distribution of tungsten and nickel in the extrudates was uniform.

EXAMPLE 9

Evaluation of Catalysts C1, C2, C3, C4, C5, C6 and C7 in a Process of the Invention: Hydrocracking of a Paraffinic Feed from the Fischer-Tropsch Process The catalysts the preparation of which is described in Examples 4, 5, 6 and 7 were used to hydrocrack a paraffinic feed from a Fischer-Tropsch unit the characteristic principals of which are given below:

| Density at 20° C. | 0.787 |
|---|---|
| Simulated distillation, SD | |
| SD: initial point | 170 |
| SD: 10% w ° C. | 197 |
| SD: 50% w ° C. | 350 |
| SD: 90% w ° C. | 537 |
| SD: end point, ° C. | 674 |
| Percentage of 370° C.+ fraction (wt %) | 44 |

Catalysts C1, C2, C3, C4, C5, C6 and C7 were used in accordance with the process of the invention in a pilot unit comprising one fixed traversed bed reactor, the fluids circulating from bottom to top (up-flow mode).

Prior to the hydrocracking test, the catalysts were reduced at 120 bars, at 450° C. in pure hydrogen.

After reduction, the catalytic test was carried out under the following conditions:
Total pressure 5.5 MPa T=356° C.
Ratio of $H_2$ to feed, 1000 normal liters/liter of feed.
The hourly space velocity (HSV) was 0.9 $h^{-1}$.

The catalytic performance is expressed as the net conversion of products with a boiling point of less than 370° C., by the net selectivity for the 150-370° C. middle distillate cut and the gas oil yield/kerosene yield ratio in the middle distillates fraction. They are calculated using the simulated distillation results.

The net conversion NC is:
NC 370° C.⁻=[(% 370° C.⁻$_{effluents}$)−(% 370° C.⁻$_{feed}$)]/[100−(% 370° C.⁻$_{feed}$)]

in which
% of 370° C.⁻$_{effluents}$=mass content of compounds having boiling points of less than 370° C. in the effluents; and
% of 370° C.⁻$_{feed}$=mass content of compounds having boiling points of less than 370° C. in the feed.

The gas oil yield/kerosene yield (Go/Ker ratio) in the middle distillate fraction is taken as:
Go/Ker ratio=yield of (250° C.-370° C.) fraction of effluent/yield of (150° C.-250° C.) fraction of effluent.

The catalytic performances obtained are given in Tables 1 and 2 below.

The net conversions of products having a boiling point of less than 370° C., as defined above are, under the operating conditions described above, provided for catalysts C1, C2, C3, C6, C7 and C8 (in accordance), C4 and C5 (not in accordance) in Table 1.

TABLE 1

| | Net conversions of 370° C.− | | | | | | |
|---|---|---|---|---|---|---|---|
| | C1 | C2 | C3 | C4 | C5 | C6 | C7 |
| NC 370° C.− (wt %) | 79.5 | 77.3 | 78.4 | 71.6 | 67 | 82.6 | 80.2 |

TABLE 2

| | Yields of products formed: | | | | |
|---|---|---|---|---|---|
| Cuts | Yields (wt %) $C_1$-$C_4$ | Yields (wt %) $C_5$-150° C. | Yields (wt %) 150-370° C. | Yields (wt %) 370° C.+ | Go/Ker ratio |
| C1 | 1.2 | 10.2 | 79.6 | 9 | 2.05 |
| C2 | 1 | 9.9 | 79.1 | 10 | 2.10 |

TABLE 2-continued

Yields of products formed:

| Cuts | Yields (wt %) $C_1$-$C_4$ | Yields (wt %) $C_5$-150° C. | Yields (wt %) 150-370° C. | Yields (wt %) 370° C.+ | Go/Ker ratio |
|---|---|---|---|---|---|
| C3 | 1.3 | 10.5 | 78.7 | 9.5 | 2.06 |
| C4 | 1.2 | 10 | 76.3 | 12.5 | 2.10 |
| C5 | 1.3 | 10 | 74.2 | 14.5 | 2.10 |
| C6 | 1.5 | 10.9 | 80.0 | 7.6 | 2.03 |
| C7 | 0.7 | 9.5 | 81.1 | 8.7 | 2.07 |

These results show (Tables 1 and 2) that the use of the process of the invention allows a paraffinic feed from the Fischer-Tropsch synthesis process to produce, by hydrocracking, very good yields of middle distillates, 150-250 cuts (kerosene) and 250-370° C. cuts (gas oil).

Further, it appears that the use of the process of the invention using catalysts C1, C2, C3 and C6, which have a phosphorus content which is in the preferred range of 0.2% to 2.5% by weight, of the oxide of the doping element phosphorus can, by hydrocracking a paraffinic feed from the Fischer-Tropsch synthesis process, produce very good yields of middle distillates, 150-250 cuts (kerosene) and 250-370° C. (gas oil) and are particularly suitable to the purpose of the invention.

EXAMPLE 10

Evaluation of Catalyst C8 in a Process of the Invention: Hydrocracking a Paraffinic Feed from the Fischer-Tropsch Process Catalyst C8, the preparation of which was described in Example 8, was used to hydrocrack a paraffinic feed described in Example 9.

Prior to the catalytic test, the catalyst had to be sulphurized. This sulphurization step was carried out using a paraffinic feed doped with dimethylsulphide. The sulphurization conditions for catalyst C were as follows:

Feed: n-heptane+2% by weight of dimethylsulphide
HSV=2 h$^{-1}$
P=50 bars
H$_2$/feed ratio=1000 Nl/l
Temperature ramp-up: 24° C./hour
Temperature at sulphurization stage: 350° C.
Duration of sulphurization stage: 12 hours.

After the sulphurization step, the catalytic test was carried out under the following conditions:

Total pressure 4.0 MPa T=360° C.
Ratio of H$_2$ to feed, 1000 normal liters/liter of feed.
The hourly space velocity (HSV) was 1.0 h$^{-1}$.

It should be noted that to maintain the catalyst in the sulphurized form, the hydrogen contained 300 ppm of hydrogen sulphide (H$_2$S).

The catalytic performances are expressed as in Example 9. Table 3 records the net conversion obtained for catalyst C8. Table 4 records the yields in the various product cuts.

TABLE 5

Net conversions of 370° C.− for catalyst C8

| | C8 |
|---|---|
| NC 370° C.$^-$ (wt %) | 77.5 |

TABLE 4

Yields of products formed for catalyst C8

| Cuts | Yields (wt %) $C_1$-$C_4$ | Yields (wt %) $C_5$-150° C. | Yields (wt %) 150-370° C. | Yields (wt %) 370° C.+ | Go/Ker ratio |
|---|---|---|---|---|---|
| C8 | 8 | 12 | 70.1 | 9.9 | 1.70 |

The invention claimed is:

1. A process for producing middle distillates from a paraffinic feed produced by Fischer-Tropsch synthesis, said process comprising subjecting said paraffinic feed to a catalytic hydrocracking/hydroisomerization with a hydrocracking/hydroisomerization catalyst which comprises at least one group VIB or group VIII hydrodehydrogenating element, 0.2% to 2.5% by weight of an oxide of a phosphorus doping element, and a non-zeolitic support based on silica-alumina containing a quantity of more than 5% by weight and 95% by weight or less of silica (SiO$_2$), said catalyst having the following characteristics:

a mean pore diameter, measured by mercury porosimetry, in the range 20 to 140 Å;
a total pore volume, measured by mercury porosimetry, in the range 0.1 ml/g to 0.5 ml/g;
a total pore volume, measured by nitrogen porosimetry, in the range 0.1 ml/g to 0.5 ml/g;
a BET specific surface area in the range 100 to 550 m$^2$/g;
a pore volume, measured by mercury porosimetry, included in pores with a diameter of more than 140 Å, of less than 0.1 ml/g;
a pore volume, measured by mercury porosimetry, included in pores with a diameter of more than 160 Å, of less than 0.1 ml/g;
a pore volume, measured by mercury porosimetry, included in pores with a diameter of more than 200 Å, of less than 0.1 ml/g; and
a pore volume, measured by mercury porosimetry, included in pores with a diameter of more than 500 Å of 0.05 to less than 0.1 ml/g
an X ray diffraction diagram which contains at least the characteristic principal peaks of at least one transition alumina included in the group composed of alpha, rho, khi, eta, gamma, kappa, theta and delta aluminas; and
a catalyst settled packing density of more than 0.75 g/cm$^3$.

2. A process according to claim 1 using a catalyst comprising a nickel-tungsten metal association.

3. A process according to claim 1, in which the phosphorus content of the catalyst is in the range 1.0% to 2.5% by weight of oxide.

4. A process according to claim 1, in which the phosphorus content in the catalyst is in the range 1.0% to 2% by weight of oxide.

5. A process according to claim 1, using a catalyst in which the proportion of octahedral Al$_{VI}$ determined by solid $^{27}$Al MAS NMR spectral analysis, is more than 50%.

6. A process according to claim 1, in which the catalyst has a cationic impurities content of less than 0.1% by weight.

7. A process according to claim 1, in which the catalyst has an anionic impurities content of less than 1% by weight.

8. A process according to claim 1, using a catalyst wherein the X ray diffraction diagram of the support contains at least the characteristic principal peaks of at least one of the transition aluminas included in the group composed by eta, theta, delta and gamma aluminas.

9. A process according to claim 1, using a catalyst wherein the X ray diffraction diagram of the support contains at least the characteristic principal peaks of at least one of the transition aluminas included in the group composed by eta and gamma aluminas.

10. A process according to claim 1, using a catalyst such that:
the ratio between the volume V2, measured by mercury porosimetry, in the range $D_{mean}$–30 Å to $D_{mean}$+30 Å over the total mercury volume is more than 0.6;
the volume V3, measured by mercury porosimetry, included in pores with a diameter of more than $D_{mean}$+30 Å, is less than 0.1 ml/g;
the volume V6, measured by mercury porosimetry, included in pores with a diameter of more than $D_{mean}$+15 Å, is less than 0.2 ml/g.

11. A process according to claim 1, in which the mean pore diameter of the catalyst is in the range 40 to 120 Å.

12. A process according to claim 1, in which the catalyst settled packing density is more than 0.85 g/cm$^3$.

13. A process according to claim 1, in which the acidity of the catalyst support, measured by IR monitoring of the thermo-desorption of pyridine, is such that the ratio B/L (ratio of the number of Bronsted sites/number of Lewis sites) is in the range 0.05 to 1.

14. A process according to claim 1, in which the hydrocracking/hydroisomerization catalyst is based on platinum and/or palladium.

15. A process according to claim 1, in which the hydrocracking/hydroisomerization catalyst contains 0.05% to 10% of a noble metal from group VIII.

16. A process according to claim 1, further comprising producing the non-zeolitic support by mixing an alumina compound that is partially soluble in an acidic medium with a silica compound completely soluble in the acidic medium, forming, and hydrothermal or thermal treatment.

17. A process according to claim 1, wherein the non-zeolitic support is obtained by mixing an alumina compound that is partially soluble in an acidic medium with a silica compound completely soluble in the acidic medium, forming, and hydrothermal or thermal treatment.

18. A process for producing middle distillates from a paraffinic feed produced by Fischer-Tropsch synthesis, comprising, successively, separation of a single fraction, termed the heavy fraction, with an initial boiling point between 120-200° C.;
a) hydrotreating at least a portion of said heavy fraction;
b) fractionating into at least 3 fractions: at least one intermediate fraction having an initial boiling point T1 in the range 120 to 200° C., and an end point T2 of more than 300° C. and less than 410° C., at least one light fraction boiling below the intermediate fraction, at least one heavy fraction boiling above the intermediate fraction;
c) passing at least a portion of said intermediate fraction through a process according to claim 1 over a non-zeolitic hydroisomerization/hydrocracking catalyst;
d) passing at least a portion of said heavy fraction through a process according to claim 1 over a non-zeolitic hydroisomerization/hydrocracking catalyst;
e) distilling the hydrocracked/hydroisomerized fractions to obtain middle distillates, and recycling the residual fraction boiling above said middle distillates in step e) over the catalyst treating the heavy fraction.

19. A process for producing middle distillates from a paraffinic feed produced by the Fischer-Tropsch synthesis, comprising the:
a) separating at least a light fraction from the feed to obtain a single fraction, termed the heavy fraction, with an initial boiling point in the range 120-200° C.;
b) optionally, hydrotreating said heavy fraction, if hydrotreatment is conducted optionally
c) removing at least a portion of water;
d) passing at least a portion of said optionally hydrotreated fraction through a process according to claim 1, wherein conversion over the hydroisomerization/hydrocracking catalyst of products with a boiling point of 370° C. or more into products with a boiling point of less than 370° C. is more than 80% by weight;
e) distilling the hydrocracked/hydroisomerized fraction to obtain middle distillates, and recycling the residual fraction boiling above said middle distillates to step d).

20. A process for producing middle distillates from a paraffinic feed produced by the Fischer-Tropsch synthesis, comprising the following steps in succession:
a) fractionating (step a)) the feed into at least 3 fractions:
at least one intermediate fraction having an initial boiling point T1 in the range 120° C. to 200° C., and an end point T2 of more than 300° C. and less than 410° C.;
at least one light fraction boiling below the intermediate fraction;
at least one heavy fraction boiling above the intermediate fraction;
b) hydrotreating (step b)) at least a portion of said intermediate fraction, optionally (c) removing a portion of water, then passage (step d)) through a process for treating at least a portion of the hydrotreated fraction over a hydrocracking/hydroisomerization catalyst;
f) passage (step f)) through a process for treating at least a portion of said heavy fraction over a hydrocracking/hydrocracking catalyst with a conversion of products with a boiling point of 370° C. or more into products with a boiling point of less than 370° C. of more than 80% by weight;
e) and g) distilling (steps e) and g)) at least a portion of the hydrocracked/hydroisomerized fractions to obtain middle distillates;
and at least one of said treatment processes is the process according to claim 1.

21. A process for producing middle distillates from a paraffinic feed produced by the Fischer-Tropsch process, comprising successively
a) optionally fractionating the feed into at least one heavy fraction with an initial boiling point in the range 120° C. to 200° C., and at least one light fraction boiling below said heavy fraction;
b) optionally hydrotreating at least a portion of the feed or the heavy fraction, where hydrotreatment is performed optionally
c) eliminating at least a portion of the water;
d) passing at least a portion of the effluent or the optionally hydrotreated fraction through a treatment process over a first hydroisomerization/hydrocracking catalyst containing at least one noble metal from group VIII;
e) distilling the hydroisomerized/hydrocracked effluent to obtain middle distillates (kerosene, gas oil) and a residual fraction boiling above the middle distillates;
f) over a second hydroisomerization/hydrocracking catalyst containing at least one noble metal from group VIII, passage into a process for treating at least a portion of said residual heavy fraction and/or a portion of said middle distillates, and distilling the resulting effluent to obtain middle distillates;
and at least one of said treatment processes is the process according to claim 1.

22. A process for producing middle distillates from a paraffinic feed produced by the Fischer-Tropsch process, comprising the following successive steps:
- a) separating the feed into at least one fraction with a low boiling point (B) which is richer in oxygen-containing compounds and at least one fraction with a high boiling point (A) which is less rich in oxygen-containing compounds;
- b) subjecting said fraction (B) to a hydrogenating treatment under conditions of a nature which avoids any substantial variation in its mean molecular weight, to obtain a hydrogenated substantially non oxygen-containing mixture of hydrocarbons;
- c) recombining at least a portion of said hydrogenated mixture of step b) with said fraction (A) to form a mixture (C) of straight-chain hydrocarbons with a reduced oxygen-containing hydrocarbon content and subjecting said mixture (C) to a hydrocracking treatment in the presence of a hydroisomerization/hydrocracking catalyst to convert at least 40% of said fraction with a high boiling point into a hydrocarbon fraction which may be distilled at a temperature of less than 370° C.;
- d) separating at least one hydrocarbon fraction from the product obtained in step c) the distillation temperature of which is in the middle distillates range;

in which process the hydrocracking process of step c) is the process according to claim 1.

* * * * *